United States Patent
Freedman

(10) Patent No.: US 7,091,719 B2
(45) Date of Patent: Aug. 15, 2006

(54) METHOD FOR DETERMINING PROPERTIES OF FORMATION FLUIDS

(75) Inventor: Robert Freedman, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 149 days.

(21) Appl. No.: 10/836,788

(22) Filed: Apr. 30, 2004

(65) Prior Publication Data

US 2005/0242807 A1 Nov. 3, 2005

(51) Int. Cl.
*G01V 3/00* (2006.01)
(52) U.S. Cl. ........................................ 324/303; 702/13
(58) Field of Classification Search ................ 324/303, 324/300; 702/6, 13
See application file for complete search history.

(56) References Cited

U.S. PATENT DOCUMENTS

| | | | |
|---|---|---|---|
| 4,994,671 A | 2/1991 | Safinya et al. | |
| 5,291,137 A | 3/1994 | Freedman | |
| 5,444,619 A | 8/1995 | Hoskins et al. | |
| 6,044,325 A | 3/2000 | Chakravarthy et al. | |
| 6,111,408 A | 8/2000 | Blades et al. | |
| 6,178,815 B1 | 1/2001 | Felling et al. | |
| 6,346,813 B1 | 2/2002 | Kleinberg | |
| 6,381,542 B1 | 4/2002 | Zhang et al. | |
| 6,727,696 B1 * | 4/2004 | Kruspe et al. | 324/303 |
| 6,754,589 B1 * | 6/2004 | Bush | 702/13 |

FOREIGN PATENT DOCUMENTS

| | | |
|---|---|---|
| GB | 2 361 789 A | 10/2001 |
| US | 2003/0128032 A1 | 7/2003 |
| WO | WO 01/84189 A1 | 11/2001 |
| WO | WO 01/86325 | 11/2001 |
| WO | WO 02/50571 A2 | 6/2002 |
| WO | WO 02/050571 A3 | 6/2002 |
| WO | WO03/0204311 | 10/2003 |

OTHER PUBLICATIONS

Charles A. Micchelli, "Interpolation of Scattered Data: Distance Matrices and Conditionally Positive Definite Functions," *Constr. Approx.* 2: 11-22 (1986).
Donald F. Specht, "A General Regression Neural Network," *IEEE Transactions on Neural Networks* vol. 2, No. 6, pp. 568-576 (Nov. 1991).
Donald A. Skoog et al., "Quantitative Aspects of Adsorption Measurement," *Fundamentals of Analytical Chemistry* 3rd ed., Ch. 22, pp. 505-511 (1976).
M.J.D. Powell, "Radial Basis Function Methods for Interpolation to Functions of Many Variables," *DAMTP* 2001/NA11, Univ. of Cambridge Dep't of Applied Mathematics and Theoretical Physics (Sep. 2001).

(Continued)

*Primary Examiner*—Louis Arana
(74) *Attorney, Agent, or Firm*—J. L. Jennie Salazar; Victor H. Segura; Brigitte L. Ethols

(57) ABSTRACT

A method for determining a property of fluids in formations surrounding an earth borehole includes the following steps: producing, from measurements on a multiplicity of fluid samples, a database of stored fluid property training values related to stored fluid measurement training values; deriving, from the database, radial basis function parameters; deriving formation fluid measurement values; and determining, using radial basis function interpolation, the property of formation fluids from values in the database, the parameters, and the derived formation fluid measurement values.

36 Claims, 17 Drawing Sheets

OTHER PUBLICATIONS

S. Haykin, "Radial-Basis Function Networks," *Neural Networks* 2nd ed., Ch. 5, pp. 256-317, Prentice Hall, Upper Saddle River, NJ (1999).

M.J. Er et al., "Face Recognition with Radial Basis Function (RBF) Neural Networks," *IEEE Transactions on Neural Networks*, v. 13, No. 3, pp. 697-710 (May 2002).

*Fluid Preparation and Compositional Analysis*, Schlumberger Marketing brochure, Mar. 2003.

*PVT Analysis*, Schlumberger Marketing brochure, Mar. 2003.

C.E. Morriss et al., "Hydrocarbon Saturation and Viscosity Estimation from NMR Logging in the Belridge Diatomite," *SPWLA* 35th Annual Logging Symposium, Jun. 19-22, 1994.

R. Freedman et al., "A New NMR Method of Fluid Characterization in Reservoir Rocks: Experimental Confirmation and Simulation Results," *SPE Journal*, pp. 452-464 (Dec. 2001).

S-W Lo et al., "Mixing Rules and Correlations of NMR Relaxation Time with Viscosity, Diffusivity, and Gas/Oil Ratio of Methane/Hydrcarbon Mixtures," *SPE Journal*, pp. 24-34 (Mar. 2002).

G. Fujisawa et al., "Analyzing Reservoir Fluid Composition in-situ in Real Time: Case Study in a Carbonate Reservoir," *SPE 84092*, SPE Annual Technical Conference and Exhibition, Denver CO (Oct. 5-8, 2003).

\* cited by examiner

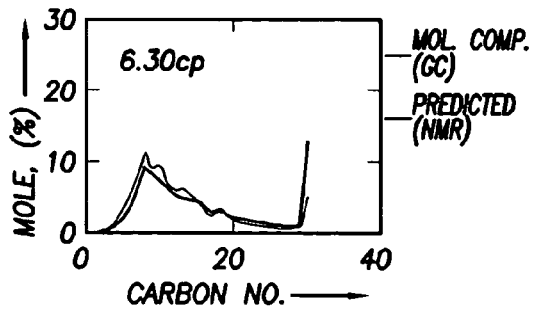
FIG.12B1
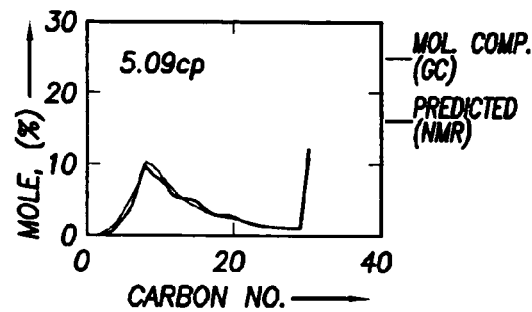
FIG.12B5
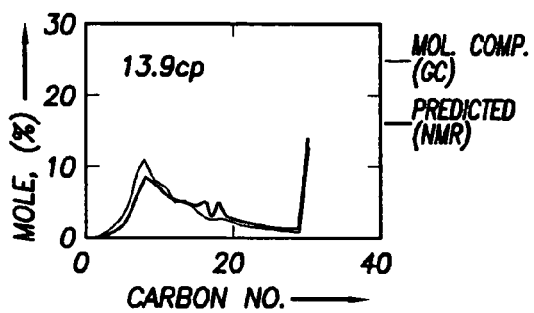
FIG.12B2
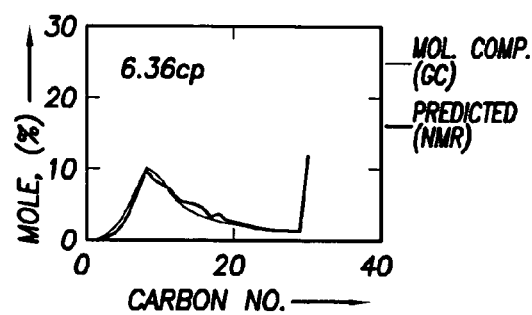
FIG.12B6
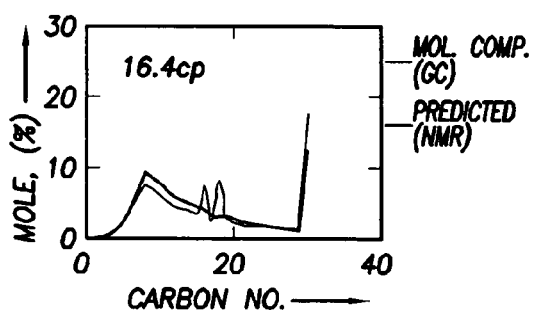
FIG.12B3
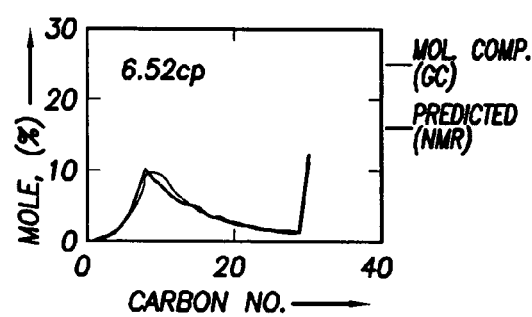
FIG.12B7
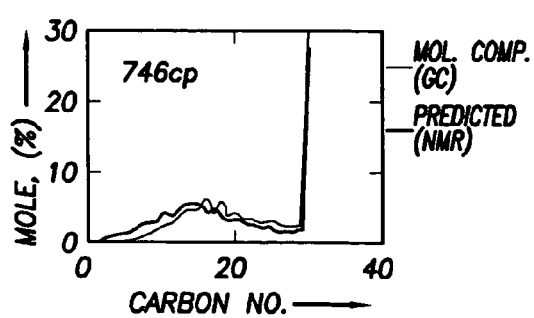
FIG.12B4
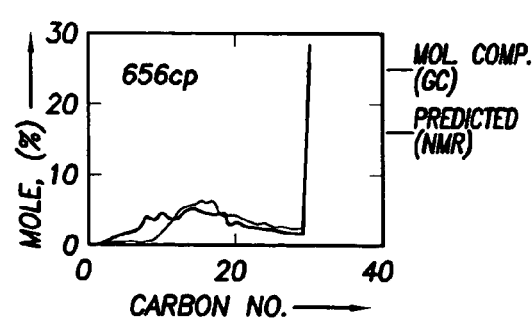
FIG.12B8

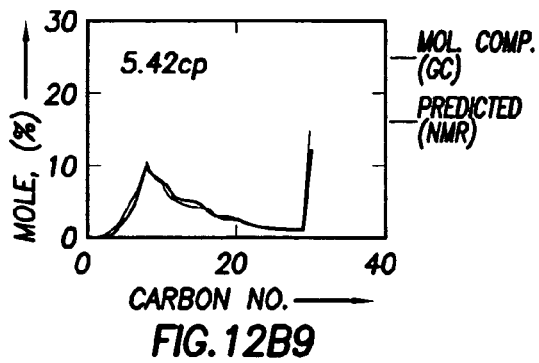
FIG.12B9
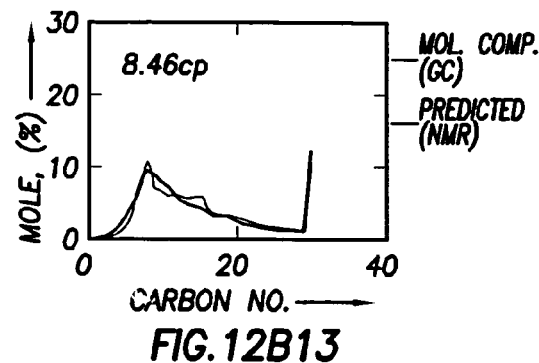
FIG.12B13
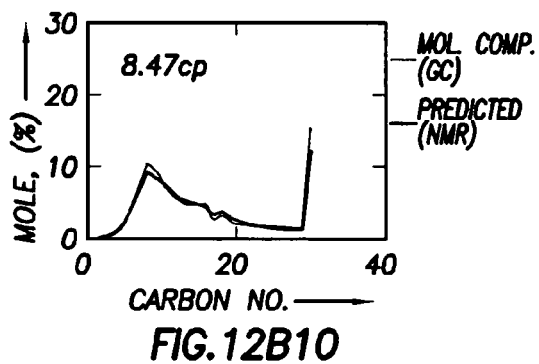
FIG.12B10
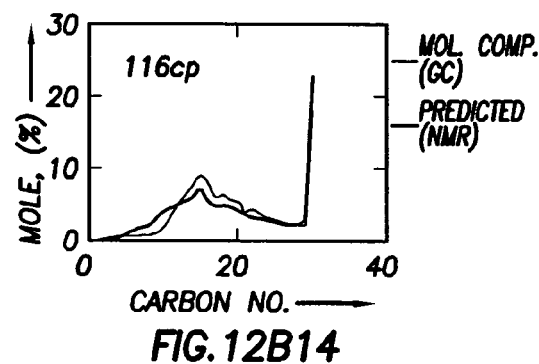
FIG.12B14
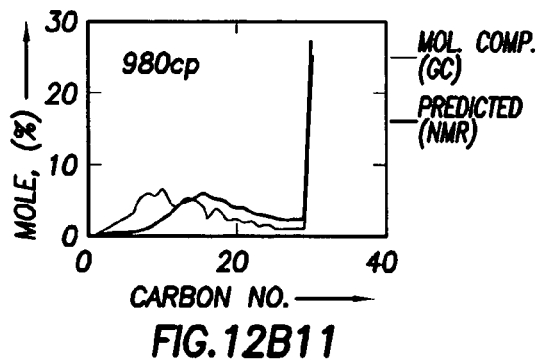
FIG.12B11
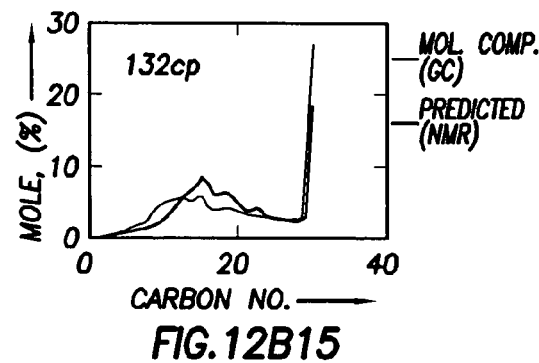
FIG.12B15
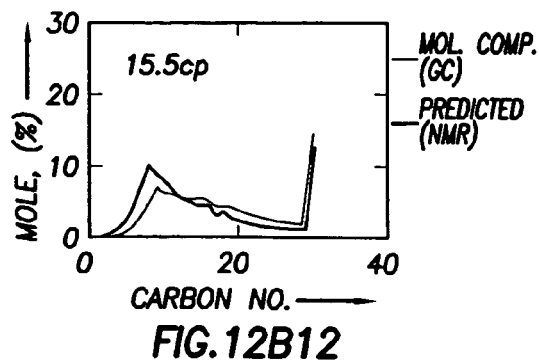
FIG.12B12
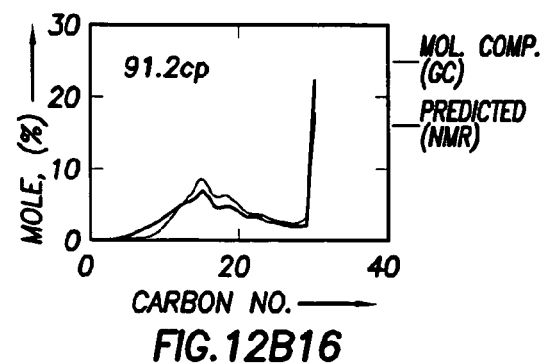
FIG.12B16

7,091,719 B2

METHOD FOR DETERMINING PROPERTIES OF FORMATION FLUIDS

FIELD OF THE INVENTION

This invention relates to techniques for determining properties of formations surrounding an earth borehole and, primarily, to a technique for determination of properties of earth formation fluids. The invention can be used, for example, to determine viscosity and/or molecular composition of crude oils using nuclear magnetic resonance (NMR) measurements made on live oil samples acquired at reservoir conditions by a downhole sampling tool.

BACKGROUND OF THE INVENTION

Downhole formation fluid sampling tools, often called formation testing tools, operate to draw, and sometimes test, fluid samples from formations. Useful measurements can be made on these fluid samples while the tool is downhole, and/or upon samples that are retained and brought uphole.

When a fluid sample is taken in a hydrocarbon bearing zone, it can be very useful to determine properties of the hydrocarbon sample, for example viscosity and/or molecular composition. However, existing techniques are limited in their ability to determine these properties. For example, viscosity can be predicted from the damping of a vibrating mechanical instrument, but such measurements downhole require that the device operate in a difficult environment that is not conducive to reliable and accurate operation of the device. A nuclear magnetic resonance (NMR) tool can be employed in a formation testing tool (see, for example, U.S. Pat. No. 6,111,408), and NMR measurements on formation fluids can provide information from which properties of the fluids can be inferred. Because petroleum fluids are complex mixtures containing many different kinds of hydrocarbon molecules, the accurate prediction of viscosity and composition for arbitrary temperature (T) and pressure (P) is difficult. One approach is to use physics models or correlations that relate the physical property being predicted to NMR measurements using an equation containing empirically determined parameters.

An example of a technique for the prediction of viscosity of formation fluids from NMR measurements of relaxation time ($T_1$ and $T_2$) and diffusion coefficient (D) distributions is based on empirical correlations (see Morriss et al., SPWLA Annual Transactions, p. 1–24, Jun. 19–22, 1994; Freedman et al., SPE Journal (75325), December 2001; Lo et al., SPE Journal (77264), March 2002). The correlations relate the logarithmic means of the distributions to viscosity using empirically determined constants. The accuracy of the viscosities predicted from these correlations is limited by three factors: (1) the detailed shape of the distributions is not accounted for (2) the empirical constants used in the correlations are not universal and can vary by as much as a factor of two for different oils and (3) the assumed form for the correlation equations is not strictly accurate.

Molecular composition can be very coarsely estimated in downhole fluid sampling tools using optical density measurements as a function of wavelength for radiation in the near infrared region (see Fujisawa et al., SPE 84092, presented at the 2003 SPE ATCE meeting). The technique uses principal component regression analysis to predict molecular groupings, i.e., $C_1$, $C_2$–$C_5$, and $C_6$+. Physics based parametric models have been proposed to predict molecular composition of crude oils from NMR measurements of relaxation time and diffusion coefficient distributions (see Heaton and Freedman U.S. Patent Publication, 2003-0128032-A1). However, it is difficult using physics models to properly account for different molecular shapes (e.g., aromatic and aliphatic hydrocarbon molecules), pressure and temperature effects, and dissolved gases.

It is among the objects of the present invention to provide a method for determination of formation fluid characteristics which overcomes shortcomings of prior art approaches.

SUMMARY OF THE INVENTION

The present invention is directed to a method for determining a property of fluids in formations surrounding an earth borehole. An embodiment of the method of the invention includes the following steps: producing, from measurements on a multiplicity of fluid samples, a database of stored fluid property training values related to stored fluid measurement training values; deriving, from said database, radial basis function parameters, such as weight and width; deriving formation fluid measurement values; and determining, using radial basis function interpolation, said property of formation fluids from values in said database, said parameters, and said derived formation fluid measurement values.

In a preferred embodiment of the invention, the step of deriving, from said database, radial basis function weight and width parameters, comprises producing a radial basis function mapping function; producing a cost function using values in the database and the mapping function; and minimizing said cost function to determine said weight and width parameters.

In one embodiment of the invention, said step of producing, from measurements on a multiplicity of fluid samples, a database of stored fluid property training values related to stored fluid measurement training values, comprises producing a database of stored fluid viscosity training values related to stored fluid nuclear magnetic resonance training values, and wherein said step of deriving formation fluid measurement values comprises deriving nuclear magnetic resonance measurement values from fluid sampled from said formations, and wherein said step of determining said property of formation fluids comprises determining viscosity of formation fluids.

In other embodiments of the invention, the determined property of formation fluids comprises gas-oil ratio of formation fluids, molecular composition of formation fluids, fluid density of formation fluids or bubble point pressure of formation fluids.

The invention has advantageous application to so-called wireline formation testing well logging devices that draw fluids from earth formations, but can also be employed in other settings, examples being measurement while drilling or measurement while tripping.

Further features and advantages of the invention will become more readily apparent from the following detailed description when taken in conjunction with the accompanying drawings.

BRIEF DESCRIPTION OF THE DRAWINGS

FIGS. 12b1–16 show graphs, for each of the sixteen samples of the example, of mole composition versus carbon number, for both predicted compositions and flashed liquid compositions from gas chromatography (GC).

DETAILED DESCRIPTION

Figure 1:
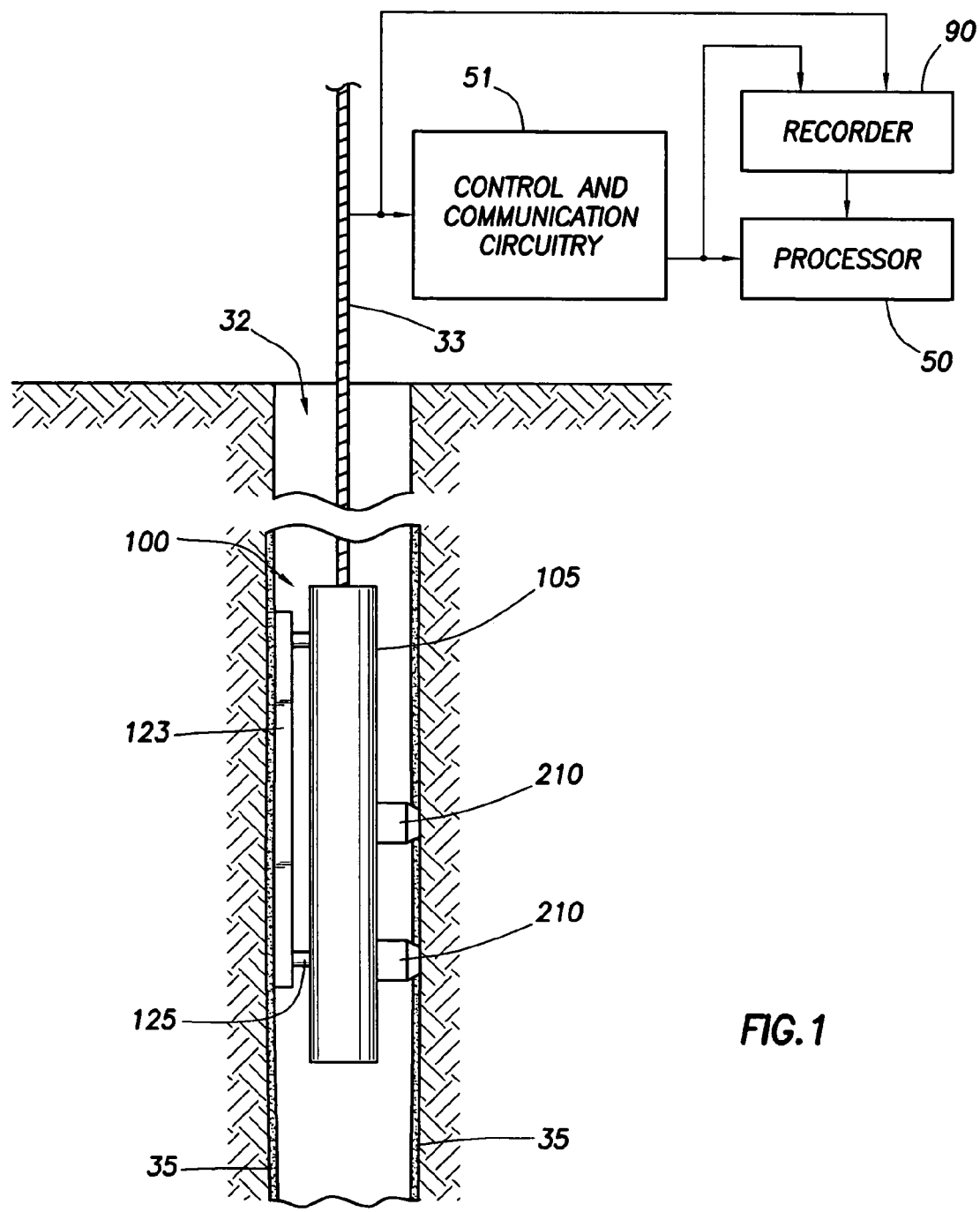
FIG. 1 is a diagram, partially in block form, of a formation testing logging device of a type that can be used in practicing embodiments of the invention.

FIG. 1 shows the borehole 32 that has been drilled, in known manner, with drilling equipment, and using drilling fluid or mud that has resulted in a mudcake represented at 35. A formation testing apparatus or device 100 is shown, and can be used in practicing embodiments of the invention. The apparatus 100 is suspended in the borehole 32 on an armored multiconductor cable 33, the length of which substantially determines the depth of the device 100. Known depth gauge apparatus (not shown) is provided to measure cable displacement over a sheave wheel (not shown) and thus the depth of logging device 100 in the borehole 32. Circuitry 51, shown at the surface although portions thereof may typically be downhole, represents control and communication circuitry for the investigating apparatus. Also shown at the surface are processor 50 and recorder 90.

The tool 100 has an elongated body 105 which encloses the downhole portion of the apparatus, controls, chambers, measurement means, etc. One or more arms 123 can be mounted on pistons 125 which extend, e.g. under control from the surface, to set the tool. The device includes one or more probe modules, each of which includes a probe assembly 210 which is movable with a probe actuator (not separately shown) and includes a probe (not separately shown) that is outwardly displaced into contact with the borehole wall, piercing the mudcake and communicating with the formations. Equipment and methods for taking pressure measurements and doing formation fluid sampling are known in the art, and the logging device 100 is provided with these known capabilities. Reference can be made, for example, to U.S. Pat. Nos. 3,934,468, 4,860,581, and 6,346,813.

Modern commercially available services utilizing, for example, a modular formation dynamics tester ("MDT"—trademark of Schlumberger), can provide a variety of measurements and samples, as the tool is modularized and can be configured in a number of ways. Examples of some of the modules employed in this type of tool, are as follows: An electric power module is generally provided. It does not have a flowline or hydraulic bus, and will typically be the first (top) module in the string. A hydraulic power module provides hydraulic power to all modules that may require same, and such power can be propagated via a hydraulic bus. Probe modules, which can be single or plural probes, includes pistons for causing engagement of probe(s) for fluid communication with the formations. Sample modules contain sample chambers for collecting samples of formation fluids, and can be directly connected with sampling points or connected via a flowline. A pumpout module can be used for purging unwanted fluids. An analyzer module employs optical analysis to identify certain characteristics of fluids. Techniques for fluid analysis are described, for example, in U.S. Pat. No. 6,178,815 to Felling et al. and/or U.S. Pat. No. 4,994,671 to Safinya et al. Temperature and pressure measurement capability are also provided. A packer module includes inflatable packer elements which can seal the borehole circumference over the length of the packer elements. Using the foregoing and other types of modules, the tool can be configured to perform various types of functions.

As depicted in FIG. 1, the downhole tool is a wireline tool. However, it will be appreciated that a variety of downhole tools may be utilized in connection with the present invention. For example, downhole drilling, coiled tubing, drill stem test or other tools adapted for drawing fluid therein may also be utilized.

Figure 2:
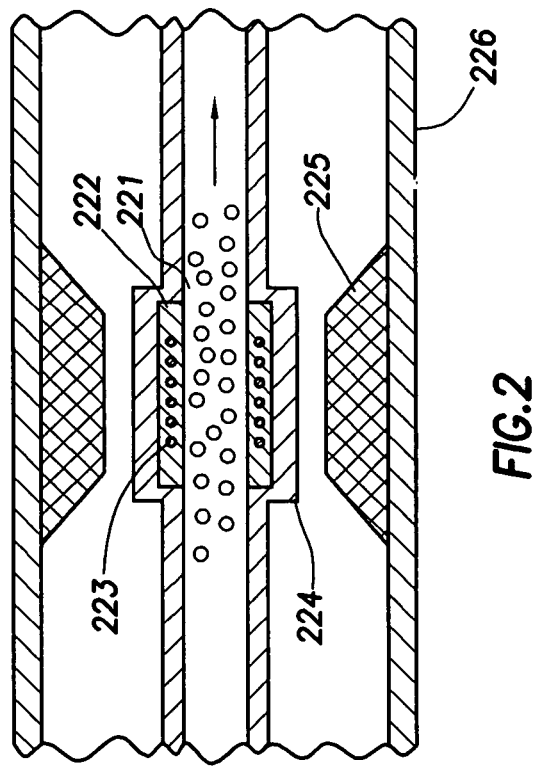
FIG. 2 shows an axial section of a portion of a flowline NMR device that can be used in practicing embodiments of the invention.

In the present embodiment, flow line NMR measurements are used and can be taken with equipment of the type disclosed in U.S. Pat. No. 6,346,813. As described therein, and shown in FIG. 2, fluid withdrawn from the formation flows through a flow channel 221. The channel is defined by a thick-wall metal tube 224 capable of withstanding formation pressure. In the NMR-instrumented section of the flow line, the channel is defined by the inside diameter of an antenna support 222. The antenna support is made of a non-conductive nonmagnetic material, for example ceramic or hard polymeric material. While FIG. 1 depicts NMR measurements, it will be appreciated that a variety of measurements may be taken, such as optical, near infrared, infrared, acoustic, sonic, x-ray, resistivity, microwave and other physical measurements or parameters.

The NMR antenna 223 is embedded in the antenna support, and radiates magnetic field at the Larmor frequency. This radiated magnetic field is conventionally called $B_1$. The NMR antenna can be a solenoidal coil which generates an oscillating magnetic field parallel to the axis of the flow channel. The antenna support is enclosed by an enlarged portion of thick wall metal tube 224, so as not to obstruct the flow channel 221. The tube 224 and antenna support 222 are able to contain the high pressure formation fluids in the flow channel. High frequency magnetic fields cannot penetrate metals, so the NMR antenna is placed inside the metal tube of the flow line. An array of permanent magnets 225 is placed outside the thick-wall metal tube. These create a constant magnetic field, conventionally called $B_0$, substantially perpendicular to the $B_1$ field generated by the antenna. The entire NMR apparatus is enclosed in a sonde housing 226 which can be attached to other similar housings in a tool string. Gradient coils (not shown) can also be provided for the purpose of making pulsed field gradient measurements of diffusion coefficient and other quantities.

As is known in the art, measurements taken with the NMR equipment can be conventionally processed to obtain quantities including spin density (proportional to NMR signal amplitude), longitudinal relaxation times $T_1$ and traverse relaxation times $T_2$, and their distributions as well as diffusion coefficients and their distributions.

Some of the theory used in the invention will next be described. Consider a problem of predicting fluid properties from a database of training examples. The problem can be cast as a non-linear multivariate regression problem. Given a set of input data $\vec{x}_i \in R^m$ (i.e., $\vec{x}_i$ are m-dimensional real vectors) and a set of corresponding outputs $\vec{y}_i \in R^n$ for i=1, 2, ..., N where N is the number of samples in the database, find a function $\vec{F}(\vec{x})$ such that, $$\vec{F}(\vec{x}_i) = \vec{y}_i + \vec{\epsilon}_i, \quad (1)$$

for each input-output pair where $\vec{\epsilon}_i$ are random measurement errors. Using the theory of radial basis function interpolation (S. Haykin, *Neural Networks: A Comprehensive Foundation*, Second Edition, Chapter 5) the function F can be written in the following form $$\vec{F}(\vec{x}) = \sum_{j=1}^{N} \vec{w}_j \varphi(\|\vec{x} - \vec{x}_j\|), \quad (2)$$

where $\{\varphi(\|\vec{x} - \vec{x}_j\|)\ j=1, 2, \ldots, N\}$ are a set of non-linear functions called radial basis functions. The double bar notation $\|\cdot\|$ denotes a norm that is usually an $L_2$ norm. The input data in the database are the centers of the radial basis functions and $\{\vec{w}_j \in R^n\ j=1, 2, \ldots, N\}$ are a set of weight vectors chosen so that the regression equations in Eq. (1) are satisfied. Micchelli ("Interpolation of Scattered Data: Distance Matrices And Conditionally Positive Definite Functions", *Constructive Approximation*, v. 2, pp. 11–22, 1986) proved that the N-by-N interpolation matrix $\Phi$ with elements $\varphi(\|\vec{x}_i - \vec{x}_j\|)$ is positive definite for Gaussian and inverse multiquadric functions so that the regression equations have a well-defined solution of the form given by Eq. 2. In the following development, normalized multivariate Gaussian radial basis functions are used to illustrate a method hereof and re-write Eq. (2) in the form $$\vec{F}(\vec{x}) = \frac{\sum_{j=1}^{N} \vec{w}_j \exp\left(-\frac{\|\vec{x} - \vec{x}_j\|^2}{2\sigma_j^2}\right)}{\sum_{j=1}^{N} \exp\left(-\frac{\|\vec{x} - \vec{x}_j\|^2}{2\sigma_j^2}\right)}. \quad (3)$$

In Eq. 3 the widths ($\sigma_j$) of the Gaussians are parameters which, like the weight vectors ($\vec{w}_j$), can be determined by minimizing a cost function. In practical applications, good results are often found by use of a single width ($\sigma$) for the Gaussian radial basis functions. Likewise it is sometimes useful to select a subset of the input database data to be the centers of the radial basis functions. Reference can be made to S. Haykin, supra, which discusses several methods for judiciously selecting the centers and the width parameters.

An intuitive understanding of how Eq. 3 can be used to predict accurate outputs from inputs that are not in the training database can be gleaned by considering the Nadaraya-Watson Regression Estimator (NWRE) (see e.g. S. Haykin, supra). The equation for the NWRE or mapping function has the same form as Eq. 3, but the weight vector is replaced by the database outputs and a single width parameter is used, i.e., $$\vec{F}(\vec{x}) = \frac{\sum_{j=1}^{N} \vec{y}_j \exp\left(-\frac{\|\vec{x} - \vec{x}_j\|^2}{2\sigma^2}\right)}{\sum_{j=1}^{N} \exp\left(-\frac{\|\vec{x} - \vec{x}_j\|^2}{2\sigma^2}\right)}. \quad (4)$$

Figure 3:
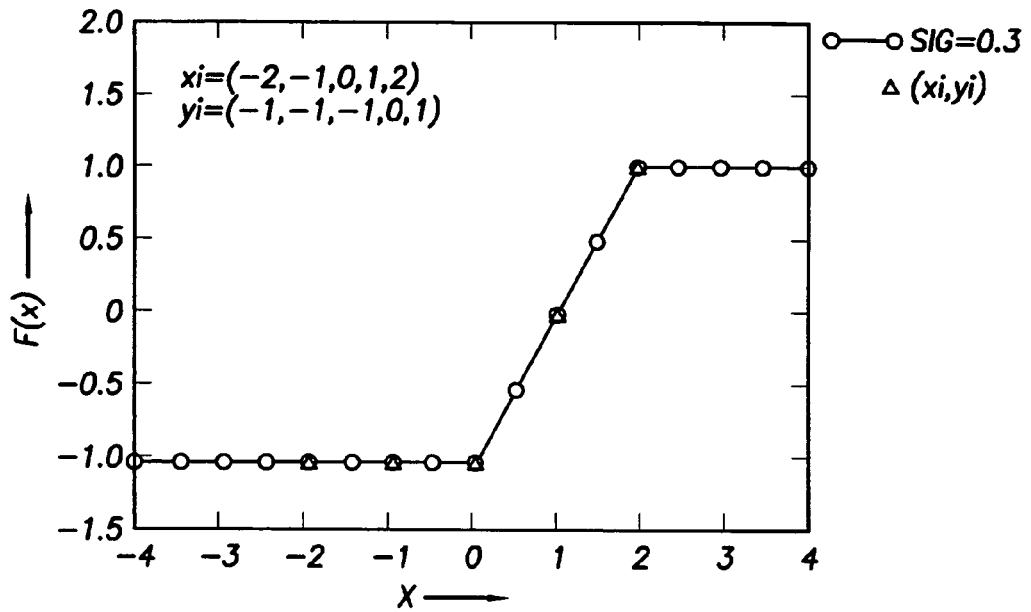
FIG. 3 is a diagram of training and testing distributions of a simplified example with interpolation.
Figure 4:
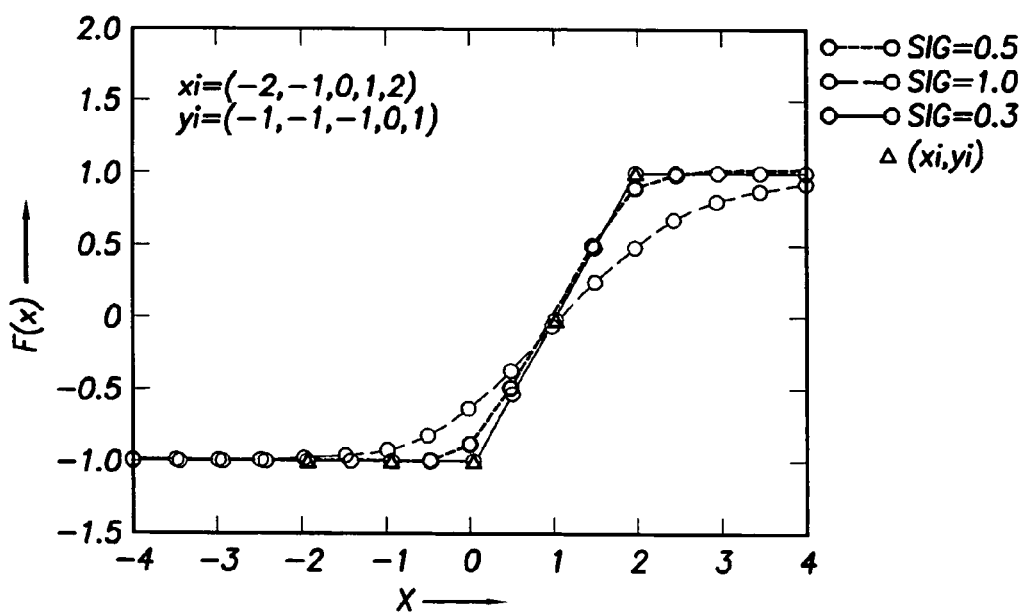
FIG. 4 is a diagram of illustrating radial basis function interpolation for three different width parameters.

It is seen that Eq. 4 satisfies the regression conditions in Eq. 1 provided that the overlaps of the Gaussian functions are negligible. In the limit of very large $\sigma$, $\vec{F}(\vec{x})$ approaches the value of the sample mean of all of the outputs. In the limit of very small $\sigma$, $\vec{F}(\vec{x})$ approaches the output value $\vec{y}_i$ corresponding to the input $\vec{x}_i$ that is closest to $\vec{x}$. Note that the estimator is the weighted average of the observations and the estimates are therefore bounded by the observed sample values. The NWRE can also be constructed using non-Gaussian functions (see e.g. D. F. Sprecht, *IEEE Trans. on Neural Networks*, vol. 2, no. 6, November 1991). A simple example from Sprecht supra, demonstrates the power of radial basis function interpolation even for a sparse input-output database. FIG. 3 shows the interpolation of a linear ramp shaped function (solid line) determined from a set of five input-output pairs (triangles). The circles are the predicted outputs (F(x)) given the inputs (x). FIG. 4 shows the sensitivity to different width parameters.

A better approximation than the NWRE is obtained if an n-dimensional weight vector ($\vec{w}_i$) determined from minimization of the cost function replaces the output vectors in Eq. 4. The cost function is, $$C = \sum_{i=1}^{N} \sum_{l=1}^{n} \left[ y_i^l - \frac{\sum_{j=1}^{N} w_j^l \exp\left(-\frac{\|\vec{x}_i - \vec{x}_j\|^2}{2\sigma^2}\right)}{\sum_{j=1}^{N} \exp\left(-\frac{\|\vec{x}_i - \vec{x}_j\|^2}{2\sigma^2}\right)} \right]^2. \quad (5)$$

The cost function can be minimized with respect to both the weights and the width parameter. Alternatively, the minimization can be performed using different fixed values of the width parameter with the optimal value being the one that gives the minimum value for the cost function. It will be evident that a more general cost function can be used to determine optimal values of the centers, widths, and weights in Eq. 3 (see e.g. Haykin, supra, Chapter 5).

In accordance with an aspect hereof, radial basis function interpolation can be used to predict more accurate viscosity estimates than existing correlations. The empirical correlations used by the existing methods (see e.g. Freedman et al., supra) will first be reviewed. The existing methods rely on the following empirical equations to estimate viscosity ($\eta$), $$\eta = \frac{aT}{T_{2,LM} f(gor)} \quad (6)$$

and, $$\eta = \frac{bT}{D_{LM}}. \quad (7)$$

Eqs. 6 and 7 provide estimates of viscosity from NMR measurements of the transverse magnetization relaxation time ($T_2$) and diffusion coefficient distributions (D), respectively. In equation 6, the longitudinal magnetization relaxation time ($T_1$) distribution can be used in place of $T_2$. T is temperature in degrees K and f(gor) in Eq. 6 is an empirically determined function of the gas-oil ratio. In both equations the viscosity estimate is inversely proportional to the logarithmic mean of the distribution. Thus, the correlations do not account for the fact that the detailed shapes of the distributions can affect the viscosity. Furthermore the empirical constants, a and b, are determined from "best fits" to the assumed regression form for the equations. The empirical constants in these equations are not universally appropriate for all crude oils and the variances in these constants can cause significant errors in estimated viscosities. An additional shortcoming of these correlations is that they do not account for the effects of pressure.

It should be noted, on theoretical grounds, that diffusion coefficient distributions should be better predictors of viscosity than relaxation time distributions. This is, in part, due to the fact that the diffusion coefficients are a measure of the translational motion of the molecules whereas relaxation times are a measure of rotational motion. Moreover, in crude oils, the presence of paramagnetic ions such as nickel and vanadium can shorten the measured relaxation times and therefore cause overestimation of the viscosity in Eq. 6.

The prediction of viscosity from NMR measurements using radial basis function interpolation can be viewed as constructing the non-linear mapping from a vector input (e.g., amplitudes in a $T_1$, $T_2$, or D distribution) to a scalar output (viscosity) given a suite of input-output examples. The following example uses $T_2$ distributions to illustrate the technique, although its will be understood that similar methodology can be used for D and $T_1$ distributions. Consider a database of input-output pairs whose inputs for each oil sample include $T_2$ distribution amplitudes ($\vec{A}_i$), temperatures ($T_i$), pressures ($P_i$), and gas-oil ratios ($gor_i$) and corresponding output viscosities ($\eta_i$). The viscosity for a crude oil sample not in the database can be predicted using the equation, $$\eta = \frac{\sum_{j=1}^{N} w_j \exp\left(-\frac{\|\vec{A} - \vec{A}_j\|^2}{2\sigma_j^2}\right) \cdot \exp\left(-\frac{(T-T_j)^2}{2\sigma_T^2}\right) \cdot}{\sum_{j=1}^{N} \exp\left(-\frac{\|\vec{A} - \vec{A}_j\|^2}{2\sigma_j^2}\right) \cdot \exp\left(-\frac{(T-T_j)^2}{2\sigma_T^2}\right) \cdot} \\ \frac{\exp\left(-\frac{(P-P_j)^2}{2\sigma_P^2}\right) \cdot \exp\left(-\frac{(gor-gor_j)^2}{2\sigma_g^2}\right)}{\exp\left(-\frac{(P-P_j)^2}{2\sigma_P^2}\right) \cdot \exp\left(-\frac{(gor-gor_j)^2}{2\sigma_g^2}\right)} \quad (8)$$

The viscosity of a live crude oil can be predicted using Eq. 8 and the measured $T_2$ distribution amplitudes ($\vec{A}$), temperature (T), pressure (P), gas-oil ratio (gor). The gas-oil ratio can also predicted, provided that one has a database of measurements that have the gor as outputs. A borehole fluid sampling tool equipped with pressure and temperature sensors and an NMR sensor, as in FIG. 1, provides the measurements needed to predict viscosity using Eq. 8. The gas-oil ratio is available in this example, since the sampling tool is also equipped with an optical fluid analyzer (OFA) for measuring optical density of the crude oil versus wavelength in the near infrared region. The accuracy of the predictions made by Eq. 8 relies on having a database with a well-paved input space of live oil measurements. The weights and widths in Eq. 8 can be determined from minimization of a cost function. Note that only the $T_2$ distribution amplitudes and not the relaxation times appear in Eq. 8. The equation does not depend on the amplitudes provided that all of amplitudes in the equation span the same range of $T_2$ values (for example, from 0.1 to 10,000 ms).

Equation 8 is readily generalized if the database also includes other measurements. For example, if in addition to the $T_2$ distribution amplitudes the database includes D and $T_1$ distributions then the amplitude vectors for these measurements would appear as additional Gaussian factors in Eq. 8.

Figure 5A:
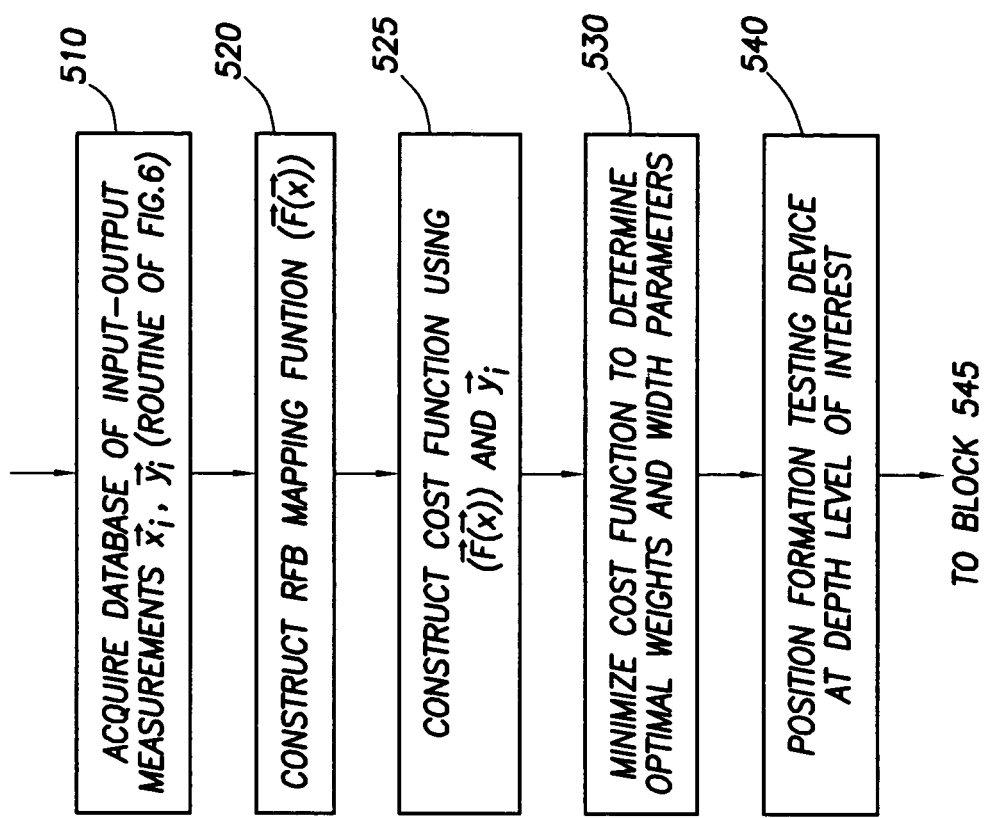
FIGS. 5A and 5B are a flow diagram of the steps of a routine for practicing an embodiment of the invention.
Figure 5B:
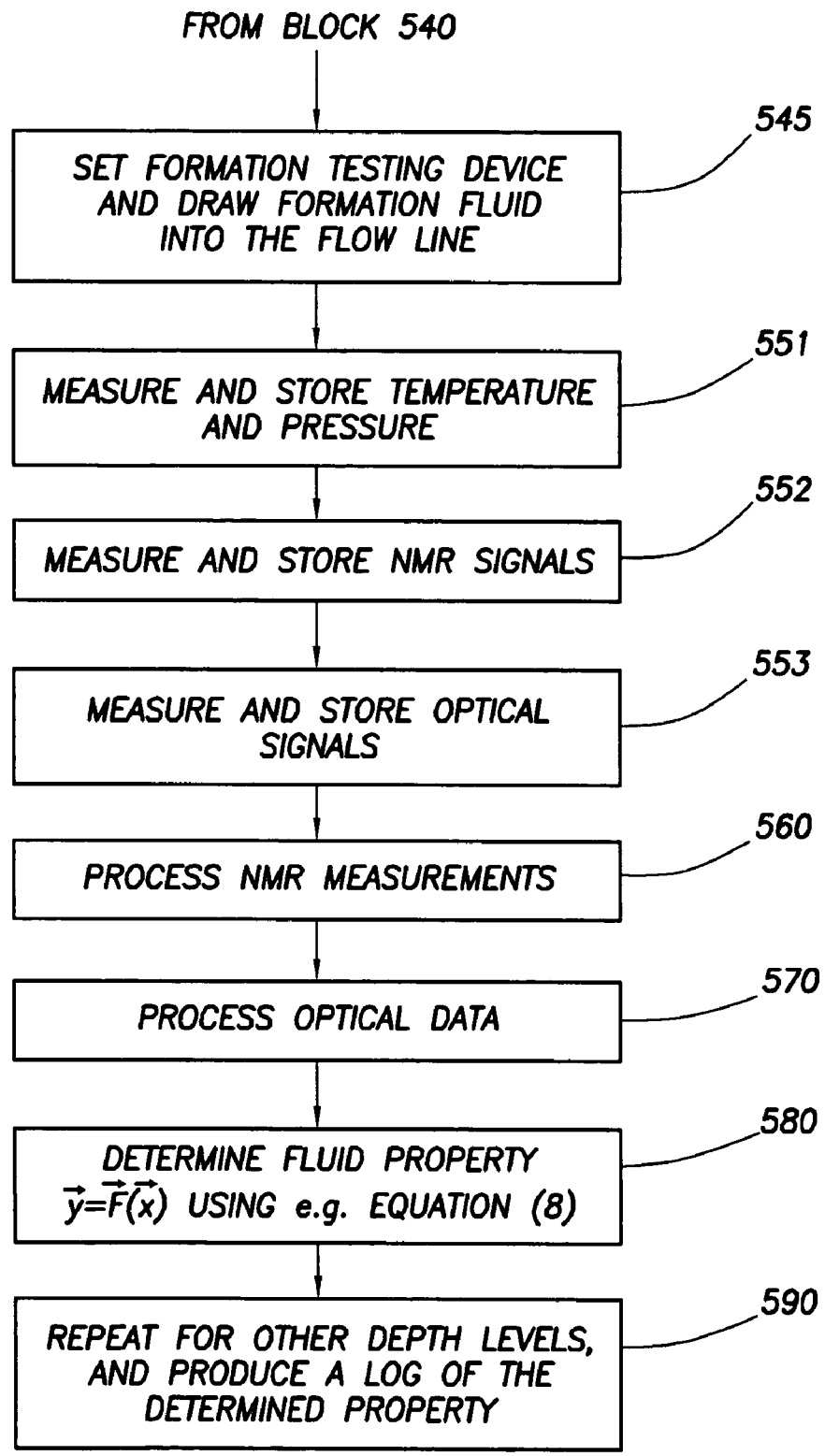

Referring to FIG. 5, there is shown a flow diagram of a routine for controlling a processor or processors, uphole and/or downhole, in accordance with an embodiment of the invention. Some of the steps will be performed, a priori, remote from the wellsite.

Figure 6A:
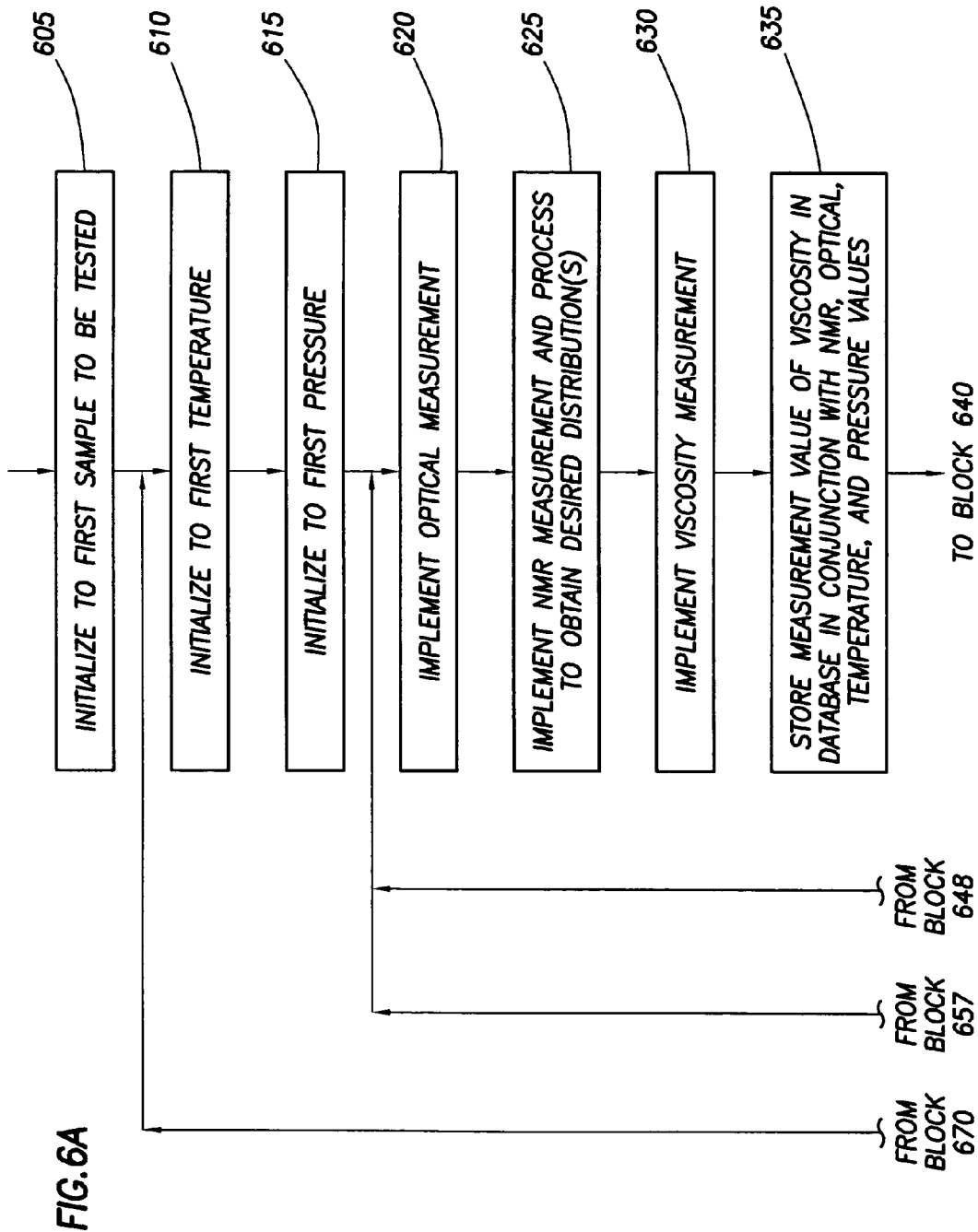
FIGS. 6A and 6B are a flow diagram of a routine for block 510 of FIG. 5, relating to acquiring a database of input-output measurements.
Figure 6B:
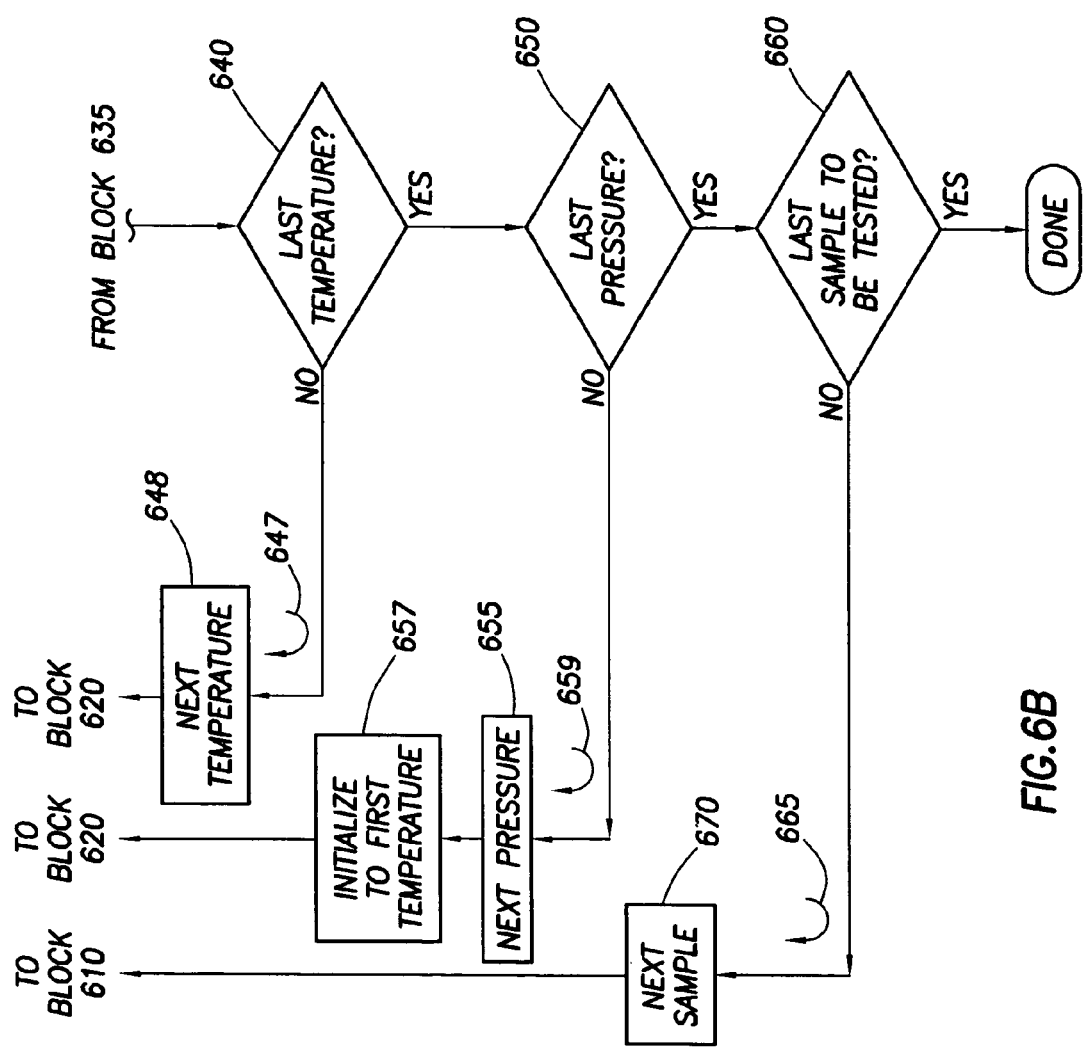

The block 510 represents acquiring a database of input-output measurements ($\vec{x}_i$, $\vec{y}_i$), an example of a routine usable for acquiring this database being described in further detail in conjunction with the flow diagram of FIGS. 6A and 6B. In FIGS. 6A and 6B, measurements on preferably live oil samples are performed, and the measurement values are stored in the database in conjunction with measurement conditions. Typically, although not necessarily, the measurements will be made in a so-called "PVT laboratory". It will be understood that the database can be compiled and added to over a substantial period of time, so as to enhance the volume of data contained therein. In the present example, each oil sample is measured in the laboratory, at several combinations of different temperatures and pressures, with measurements including, for example NMR and optical, and viscosity as an "output" fluid property. It will be understood, however, that various other measurements could be made (e.g. sonic, x-ray, resistivity, optical, near infrared, infrared, acoustic, sonic, microwave, etc.) in conjunction with further acquired "output" fluid properties (e.g. GC composition, bubble point pressure, oil formation volume factor, SARA composition (Saturates, Aromatics, Resins, Asphaltenes), etc.). In FIG. 6, the block 605 represents initializing to the first sample to be tested, and the blocks 610 and 615 respectively represent initializing to the first temperature and pressure for testing. Measuring and storage on the current sample at the current pressure and temperature are then implemented, as represented by the blocks 620, 625, 630, and 635. The block 620 represents implementing a sensor measurement, such as optical density, and the block 625 represents implementing NMR measurements, which may be processed to obtain $T_1$, $T_2$, and/or D distributions. The block 630 represents implementing a viscosity measurement. The block 635 represents storing the measurement value of viscosity in the database (as an "output" value) in conjunction with the measured NMR and optical density values and the current values of pressure and temperature. Inquiry is made (decision block 640) as to whether the last temperature has been processed. If not, the next temperature is set (block 648), and the measurements are made and stored, and the loop 647 continues until all temperatures in a predetermined range have been considered. Inquiry is then made (decision block 650) as to whether the last pressure has been processed. If not, the next pressure is set (block 655) the temperature is re-initialized (block 657), and the loop 659 (with subloop 647) continues as all pressure and temperature combinations in predetermined ranges are employed. Inquiry is then made (decision block 660) as to whether the last sample has been tested. If not, the next sample is taken for testing (block 670), the block 610 is re-entered, and the loop 665 is continued until all samples have been tested, and a phase of the database is compiled.

Referring again to FIG. 5, using the database, a radial basis mapping function, $\vec{F}(\vec{x})$, is constructed (block 520) in accordance with equation (3). Then, a cost function is constructed (block 525) using $\vec{F}(\vec{x}_i)$ and $\vec{y}_i$, as in equation (5). The cost function is minimized (block 530) to determine optimal parameters, such as weights and widths.

The block 540 represents positioning the formation testing device 100 at a depth level of interest in the borehole (e.g. in a probable hydrocarbon bearing zone), and the block 545 represents setting of the device and drawing formation fluid into the flow line. As is known in the art, a pretest can be implemented before the fluid to be tested is drawn.

The blocks 551, 552, and 553 represent the taking of measurements on fluids drawn into the formation testing device. In particular, the block 551 represents the taking of temperature and pressure measurements, the block 552 represents the taking of NMR measurements, for example using flow line NMR apparatus of FIG. 2, and the block 552 represents the taking of optical measurements, for example with the above described OFA. The block 560 represents the processing of the NMR measurements, in known fashion, to obtain $T_1$, $T_2$ and/or D (diffusion coefficient) distributions. The block 570 represents processing of the optical data, in known fashion, to obtain gas-oil ratio (gor). Then, as represented by the block 580, a fluid property (viscosity in this example) is determined from $\vec{y} = \vec{F}(\vec{x})$; in this example equation (8) being used to determine viscosity as a function of $T_2$ distribution amplitudes, temperature, pressure, and gor, using the database and the determined optimal weights and width parameters. The process may be repeated as desired, for example at other depth levels to produce a log of the determined property 590.

Figure 7:
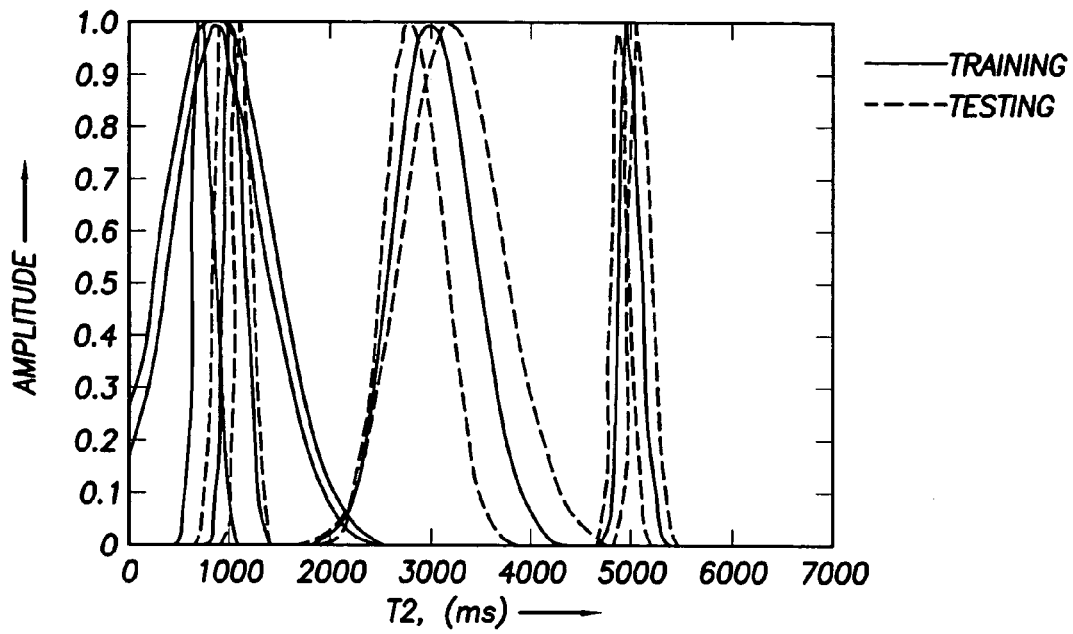
FIG. 7 is a graph of amplitude as a function of $T_2$ of training and testing distributions for an example.

To illustrate viscosity prediction with a simple example that uses synthetic data, consider an input-output training database consisting of inputs that are synthetic Gaussian shaped $T_2$ distributions. These correspond to the $\vec{A}_i$ in Eq. 8. The training database outputs are viscosities ($\eta_i$) computed from the logarithmic mean using Eq. 6. In this example the oils are dead oils for which gor=0 and the function, f(gor), in Eq. 3 is equal to one. To test the viscosity prediction a validation (i.e., testing) suite of synthetic Gaussian shaped $T_2$ distributions was used. The training and testing distributions are shown in FIG. 7. Note that the training and testing data have different shapes (positions and widths). The training and testing data are assumed to be at the same temperature and pressure.

Figure 8:
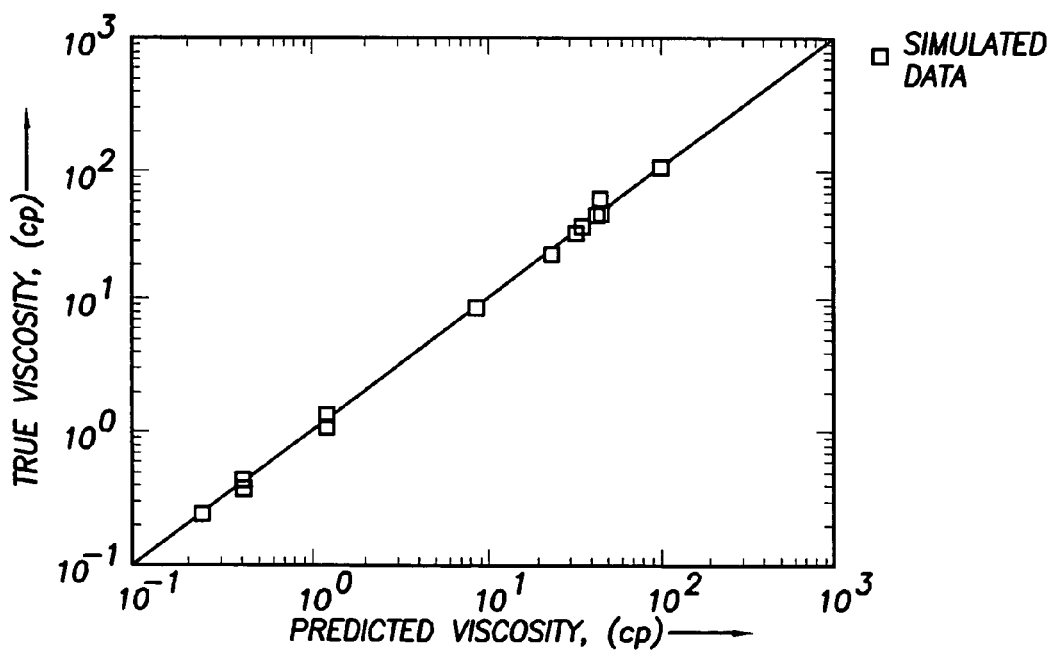
FIG. 8 shows, for the data of the example of FIG. 7, the viscosity predicted for each testing distribution using equation (8) compared to true viscosity computed from equation (6).

FIG. 8 shows the viscosity predicted for each testing distribution using Eq. 8 compared to the true viscosity computed from Eq. 6.

The method of viscosity prediction hereof using $T_2$ distribution amplitudes can also be applied directly to D or $T_1$ distributions. A database of D or $T_1$ distributions and the corresponding measured viscosities would be used to construct equations analogous to Eq. 8.

Figure 9A:
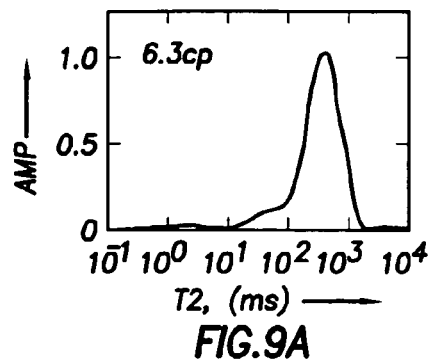
FIGS. 9A–P show graphs of $T_2$ distributions for sixteen samples of Table 1 used in an example.
Figure 9E:
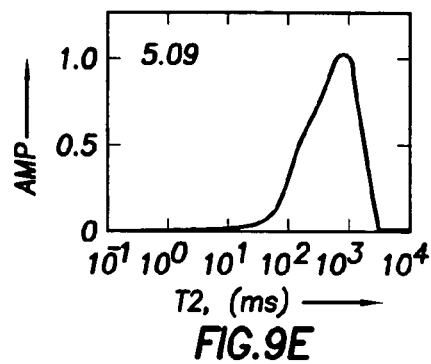
Figure 9B:
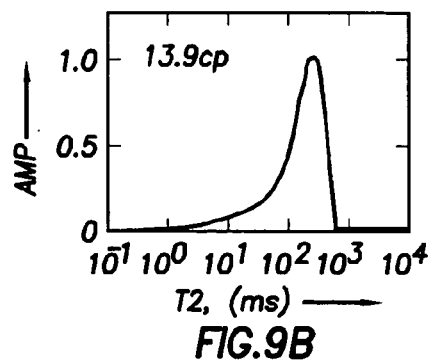
Figure 9F:
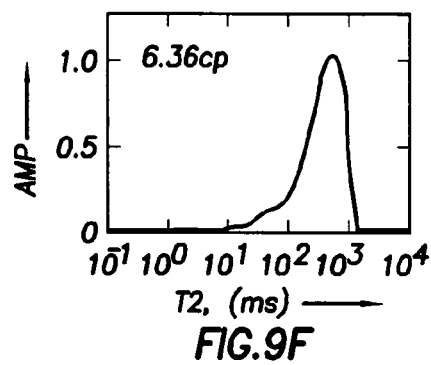
Figure 9C:
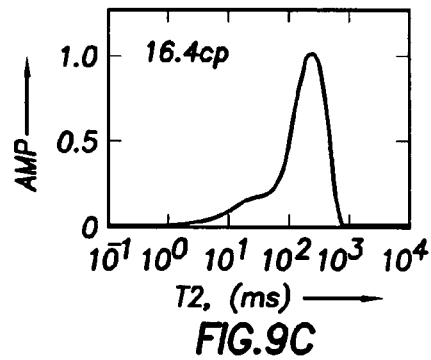
Figure 9G:
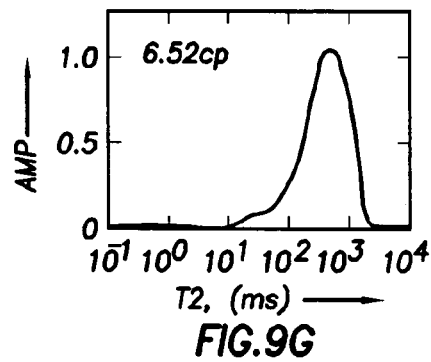
Figure 9D:
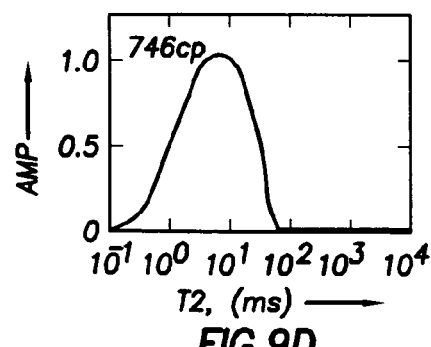
Figure 9H:
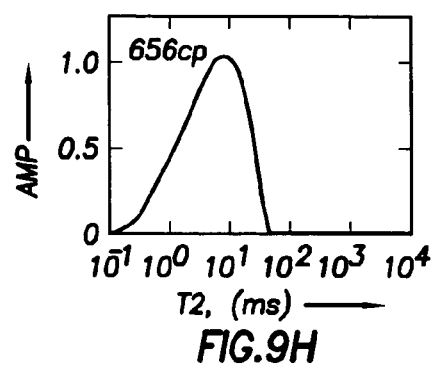
Figure 9I:
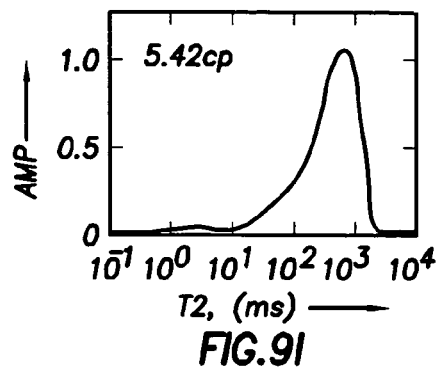
Figure 9M:
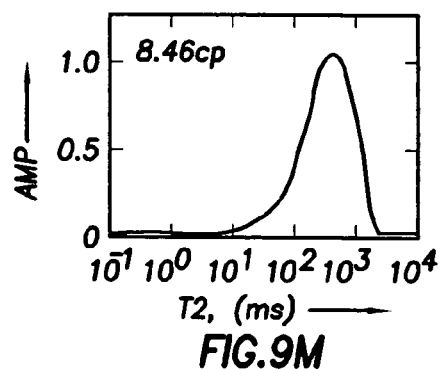
Figure 9J:
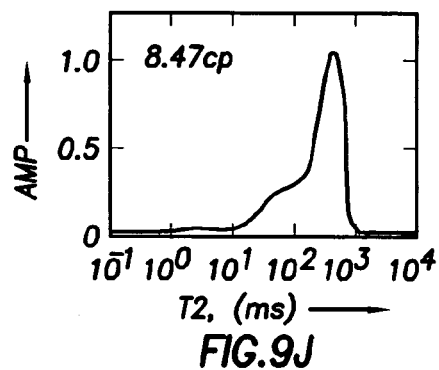
Figure 9N:
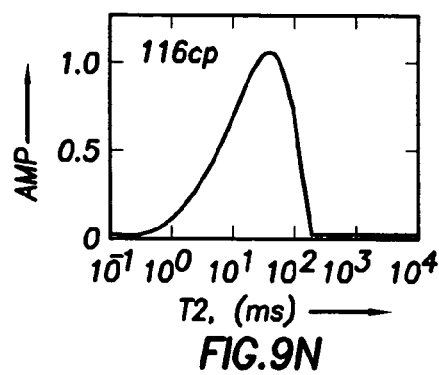
Figure 9K:
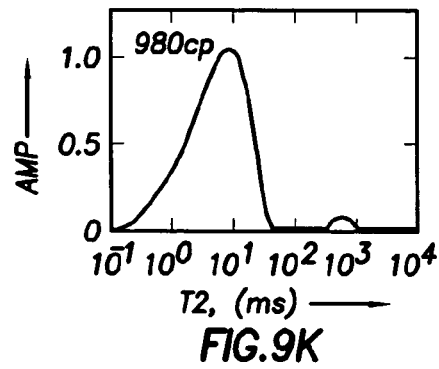
Figure 9O:
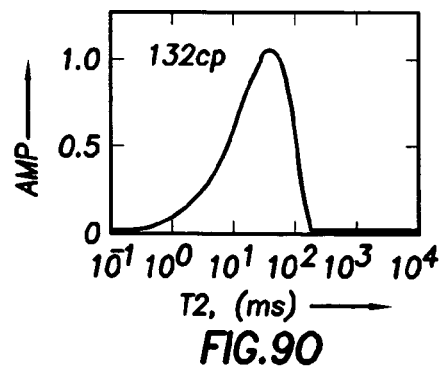
Figure 9L:
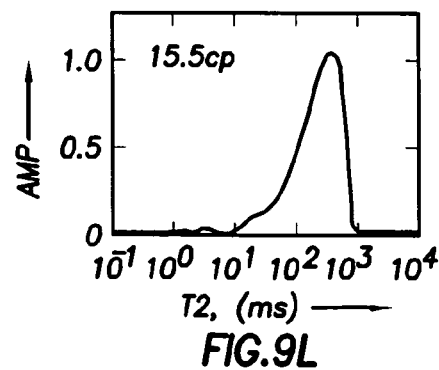
Figure 9P:
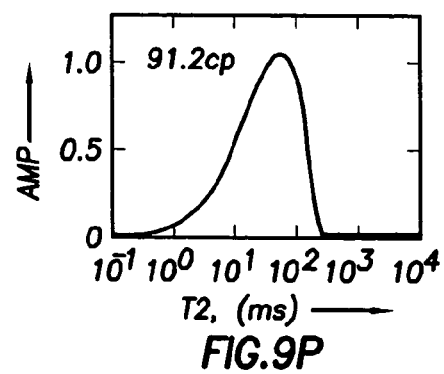

Viscosity prediction was also tested using a database of $T_2$ distributions and corresponding measured viscosities acquired on a suite of 16 dead crude oil samples at a temperature of 30° C. at atmospheric pressure. The measured viscosities are shown in Table 1. The corresponding measured T2 distributions are shown in FIGS. 9A–P, respectively.

TABLE 1

| Measured Viscosities of 16 Dead Crude Oils | |
|---|---|
| Sample | Measured Viscosity (cp) |
| 1 | 6.30 |
| 2 | 13.9 |
| 3 | 16.4 |
| 4 | 746.0 |
| 5 | 5.09 |
| 6 | 6.36 |
| 7 | 6.52 |
| 8 | 656.0 |
| 9 | 5.42 |
| 10 | 8.47 |
| 11 | 980.0 |
| 12 | 15.5 |
| 13 | 8.46 |
| 14 | 116.0 |
| 15 | 132.0 |
| 16 | 91.2 |

Figure 10:
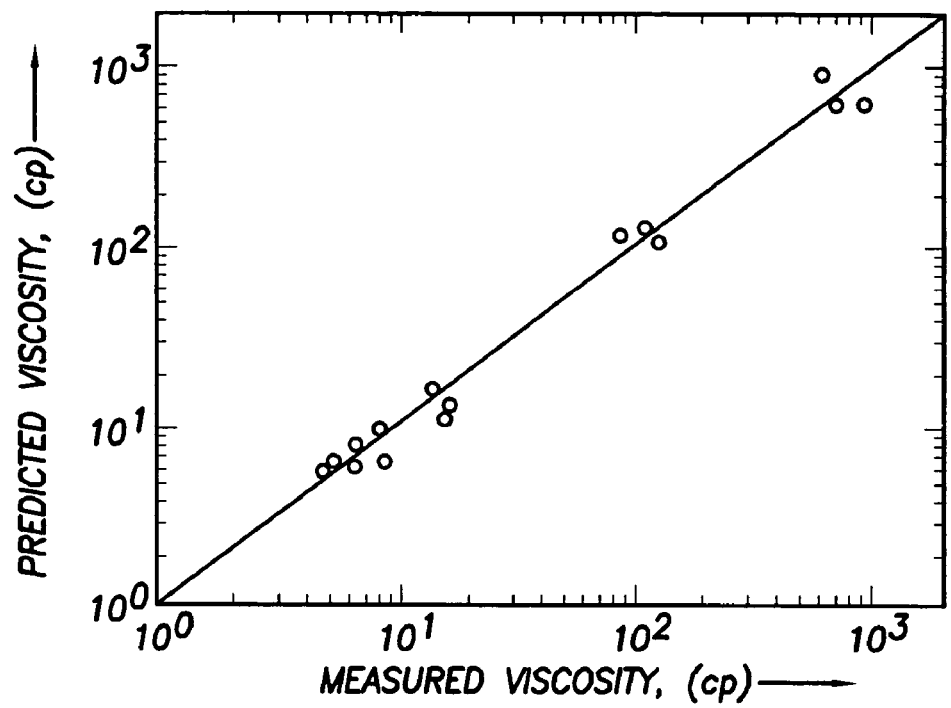
FIG. 10 shows a graph of predicted viscosity, using an approach of an embodiment of the invention, versus measurement viscosity for the example using the sixteen samples of Table 1.
Figure 11:
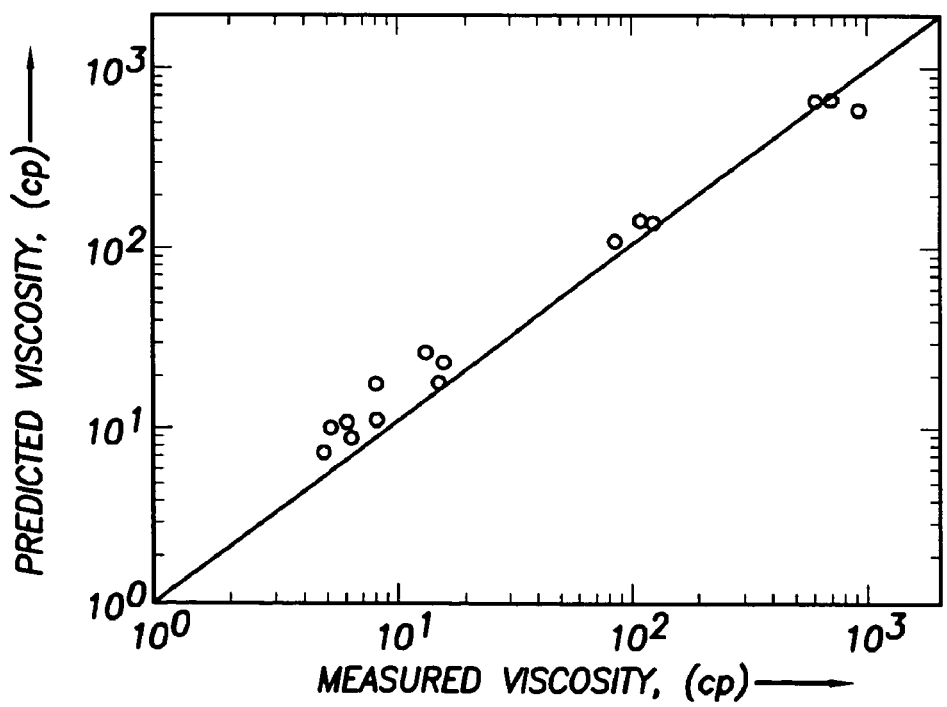
FIG. 11 shows a graph of predicted viscosity, using a prior art approach, versus measured viscosity for the example using the sixteen samples of Table 1.

Note that samples 10 and 13 have almost identical measured viscosities but their $T_2$ distributions have quite dissimilar logarithmic means. For example, sample 10 has a mean of 174 ms whereas sample 13 has a mean of 279 ms. These two samples illustrate an obvious shortcoming of the prior art method (see Eq. 6) of predicting oil viscosity from measurements of NMR T2 distributions. FIG. 10 shows the radial basis function prediction of viscosity. The viscosity of each sample was predicted from using a database consisting of the remaining 15 samples. It is seen that the radial basis function predictions of viscosity are in good agreement with the measured values. The viscosities of the samples in Table 1 were also estimated from the log means of the $T_2$ distributions shown in FIG. 9. A value a=9.558 was used for the correlation parameter in Eq. 6. The comparison of the viscosities predicted from the log means with the measured viscosities is shown in FIG. 11. It can be seen from FIGS. 10 and 11 that the viscosities predicted using the technique hereof are in much better agreement with the measured viscosities than are those predicted from the log means. A further advantage of the technique hereof over Eqs. 6 and 7 for predicting viscosity comes when the measurements are made at elevated temperatures and pressures on live oils.

An embodiment hereof determines molecular composition of hydrocarbon samples drawn from earth formations. The prediction of molecular composition of live crude oils from NMR measurements using radial basis function interpolation can be viewed as constructing the non-linear mapping from a vector input (e.g., $T_1$, $T_2$ or D distribution) to a vector output (molecular composition) given a suite of input-output examples (data). The example to follow uses $T_2$ distributions to illustrate the technique, although it will be understood that the same methodology can be applied to D and $T_1$ distributions. Consider a database of input-output pairs whose inputs for each oil sample consist of $T_2$ distribution amplitudes ($\vec{A}_i$), temperatures ($T_i$), pressures ($P_i$), gas-oil ratios ($gor_i$) and corresponding output molecular compositions ($\vec{M}_i$). The molecular composition for a crude oil sample not in the database can be predicted using the equation $$\vec{M} = \frac{\sum_{j=1}^{N} \vec{w}_j \exp\left(-\frac{\|\vec{A} - \vec{A}_j\|^2}{2\sigma_j^2}\right) \cdot \exp\left(-\frac{(T - T_j)^2}{2\sigma_T^2}\right) \cdot \exp\left(-\frac{(P - P_j)^2}{2\sigma_P^2}\right) \cdot \exp\left(-\frac{(gor - gor_j)^2}{2\sigma_g^2}\right)}{\sum_{j=1}^{N} \exp\left(-\frac{\|\vec{A} - \vec{A}_j\|^2}{2\sigma_j^2}\right) \cdot \exp\left(-\frac{(T - T_j)^2}{2\sigma_T^2}\right) \cdot \exp\left(-\frac{(P - P_j)^2}{2\sigma_P^2}\right) \cdot \exp\left(-\frac{(gor - gor_j)^2}{2\sigma_g^2}\right)}. \quad (9)$$

Equation 9 differs only slightly from Eq. 8 used for viscosity estimation. The difference is that the predicted outputs and weights are vectors. The predicted molecular composition ($\vec{M}$) is an n-dimensional vector whose elements are, for example, molar fractions corresponding to the different molecular weights or carbon numbers of the constituents in the crude oil. The weights and the widths of the radial basis functions can be determined by minimization of a cost function of the same form as the one in Eq. 5. The NWRE approximation, i.e., let $\vec{w}_i = \vec{M}_i$, may be used as an initial estimate of the weight vector.

Figure 12A:
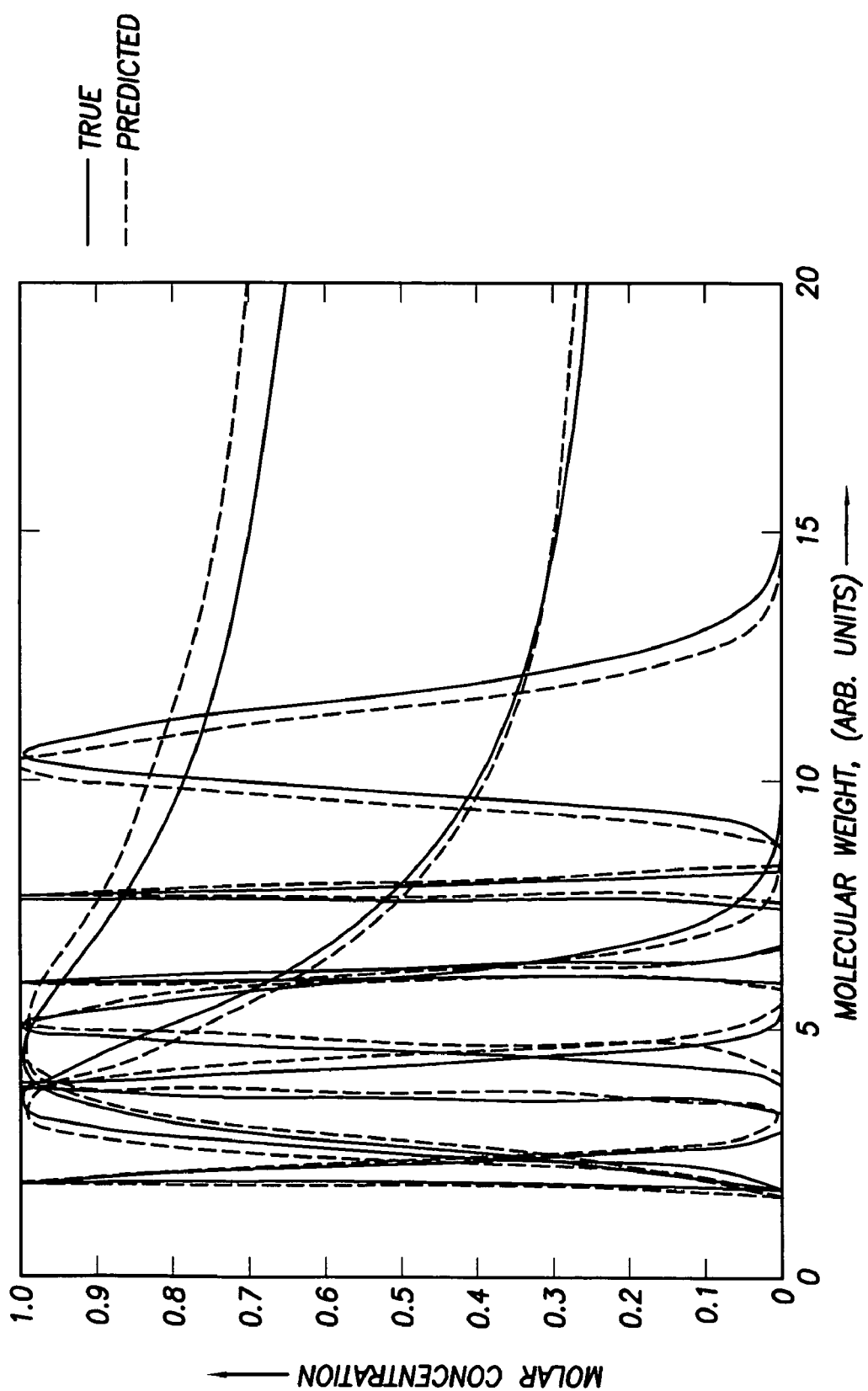
FIG. 12A shows a graph of molar composition versus molecular weight for true versus predicted compositions for an example using simulated data.

FIG. 12A compares the predicted and true molecular composition curves for simulated data. The molecular compositions used for the training data outputs were computed from the input Gaussian $T_2$ distributions using a simple physics model equation, i.e., $$M_l^i = \frac{100 \, T_{2,LM}^{0.5}}{T_{2,l}^{0.8}}. \quad (10)$$

$T_{2,l}$ is the l-th component of the set of equally spaced (on a logarithmic scale) values of relaxation times for the input training and testing data. The true molecular compositions plotted in FIGS. 12b1–16, respectively, were also computed from Eq. 10 using the testing $T_2$ distributions.

The preceding example showed predicted versus true molecular composition curves for simulated data. The present example shows the results of predicting the molecular compositions of 16 dead crude oils from their measured $T_2$ distributions shown in FIG. 9. The database consisted of input-output pairs of the measured $T_2$ distributions and molecular compositions measured using gas chromatography (GC). The molecular composition for each sample was predicted from its $T_2$ distribution, using the NWRE approximation, after first removing that sample from the database and then predicting its molecular composition from the other 15 input-output pairs in the database. The predicted compositions are compared with the flashed liquid (i.e., dead oil) compositions from GC. The results are shown in FIGS. 12b1–16, respectively. Note the excellent overall agreement of the NMR predicted compositions with those from GC. These results would tend to be improved by increasing the size and diversity (e.g., add more viscous oils) of the database.

Figure 13A:
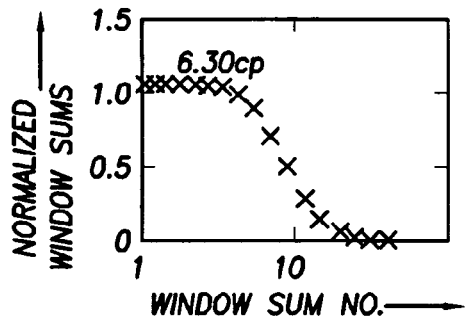
FIGS. 13A–P show graphs of normalized window sums for the sixteen samples of the example.
Figure 13E:
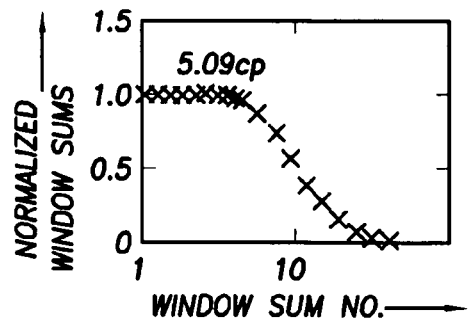
Figure 13B:
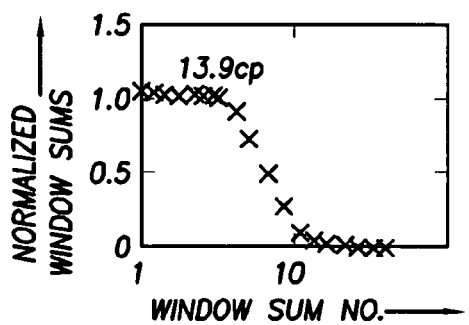
Figure 13F:
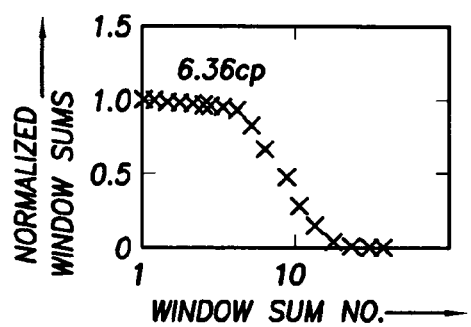
Figure 13C:
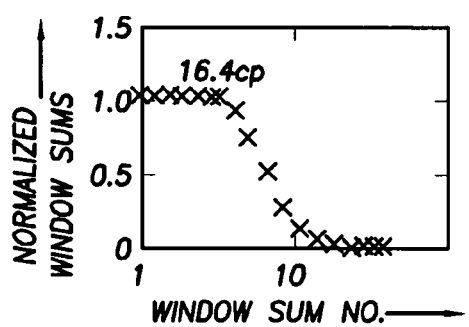
Figure 13G:
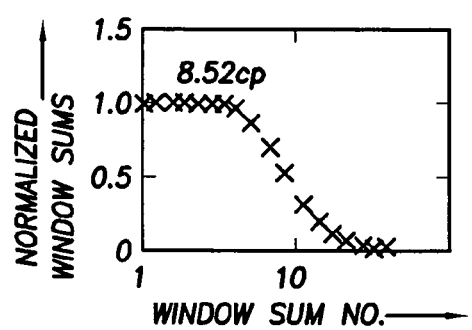
Figure 13D:
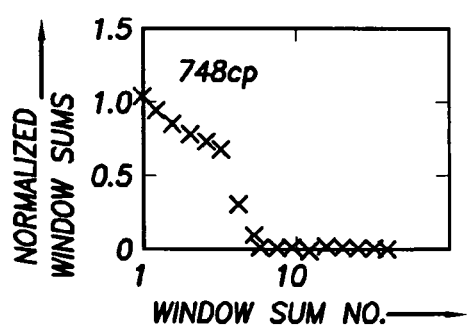
Figure 13H:
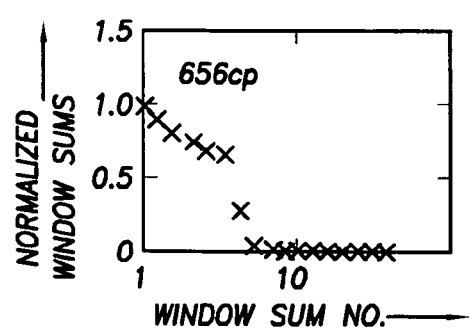
Figure 13I:
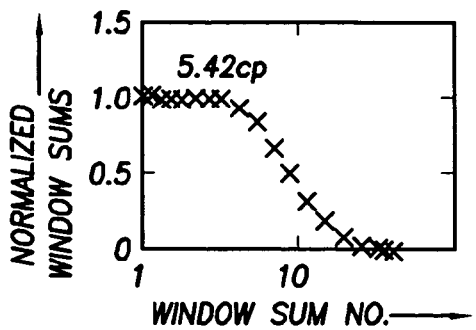
Figure 13M:
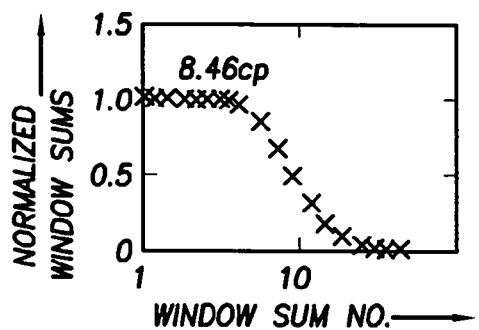
Figure 13J:
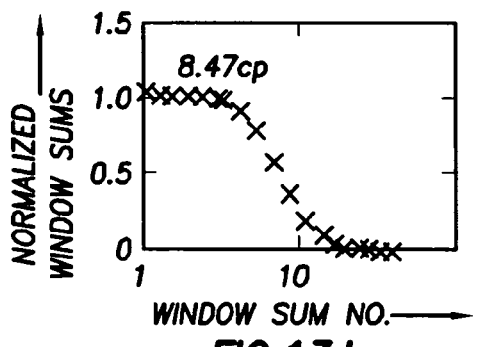
Figure 13N:
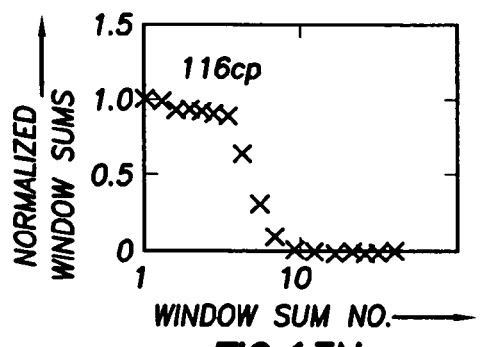
Figure 13K:
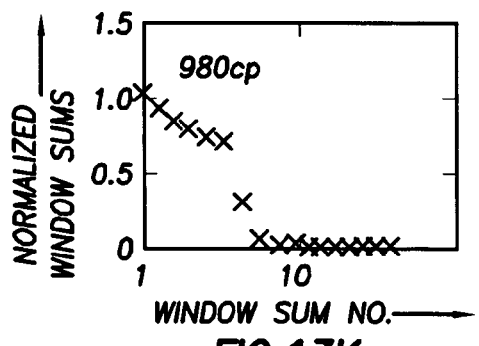
Figure 13O:
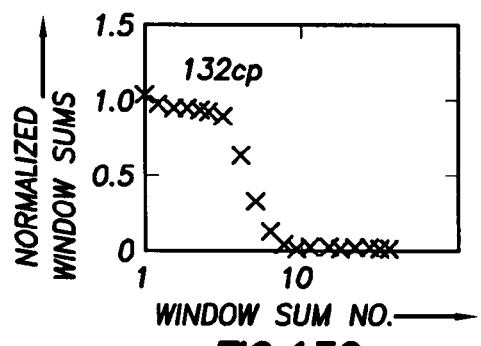
Figure 13L:
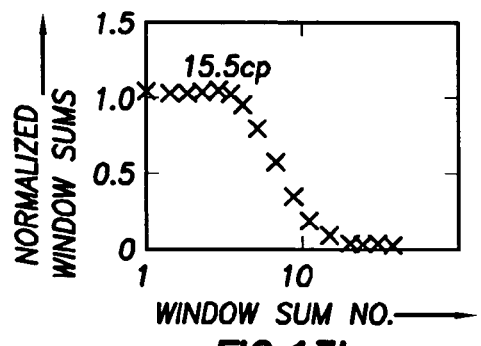
Figure 13P:
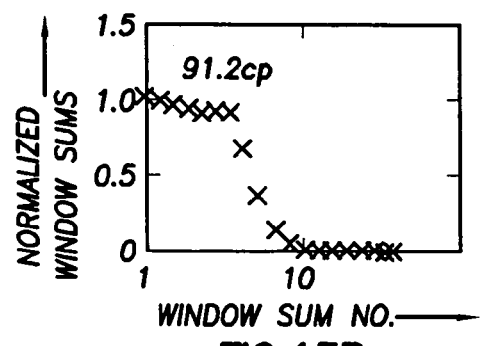
Figure 14A:
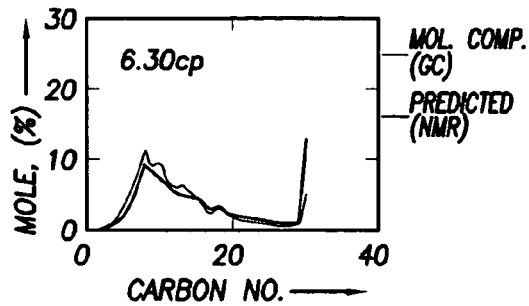
FIGS. 14A–P shows graphs of mole percentage versus carbon number, for both predicted compositions and flashed liquid compositions from gas chromatography (GC). In this case, the predicted compositions are based on the normalized window sums.
Figure 14E:
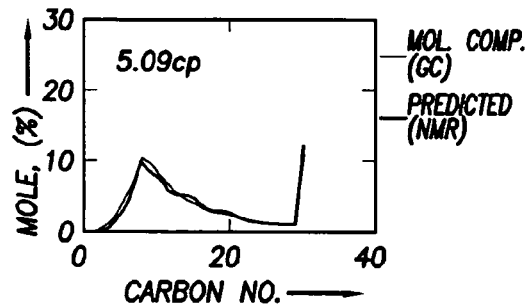
Figure 14B:
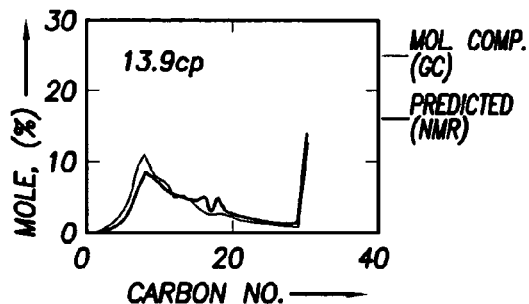
Figure 14F:
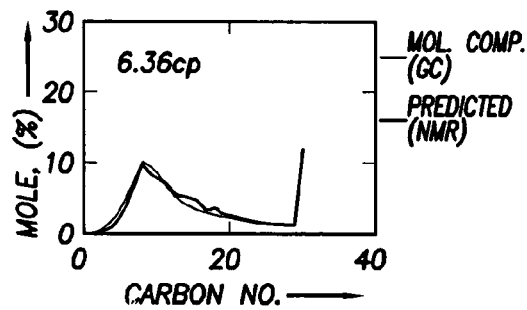
Figure 14C:
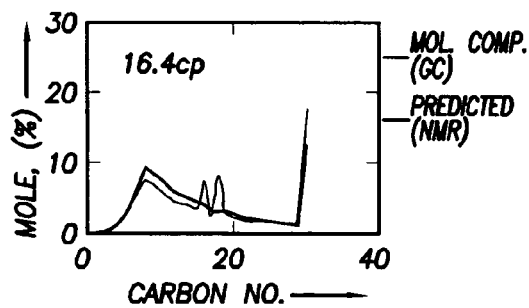
Figure 14G:
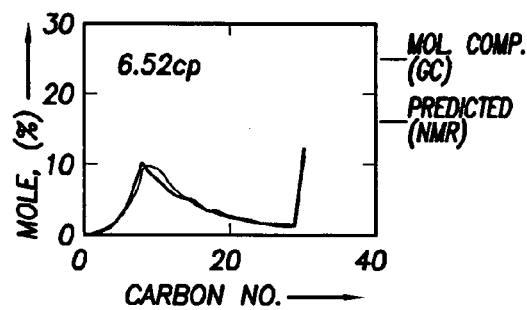
Figure 14D:
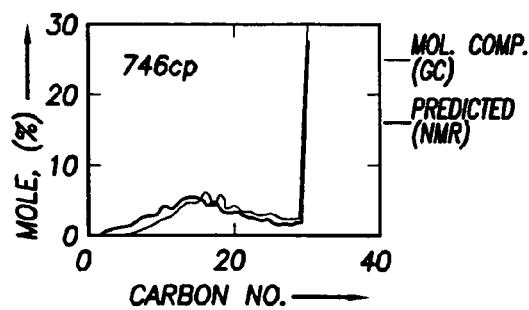
Figure 14H:
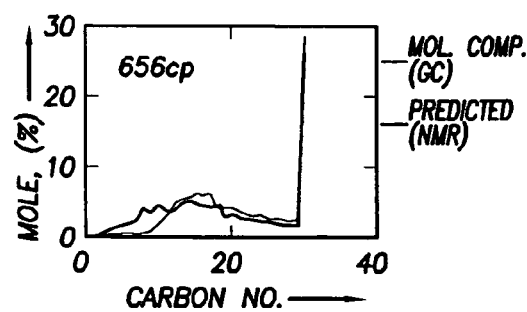
Figure 14I:
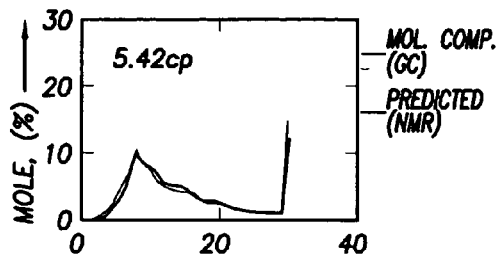
Figure 14M:
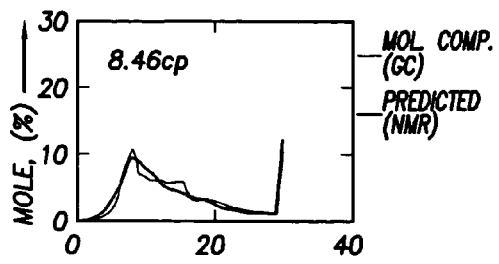
Figure 14J:
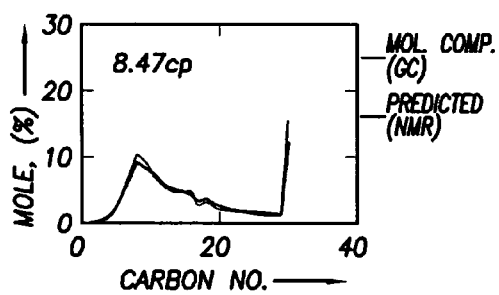
Figure 14N:
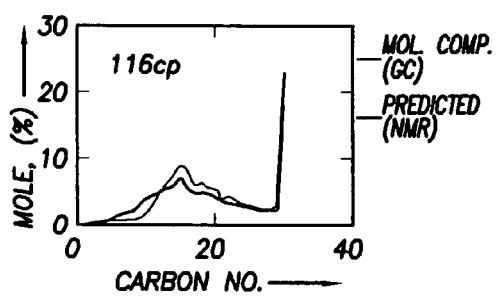
Figure 14K:
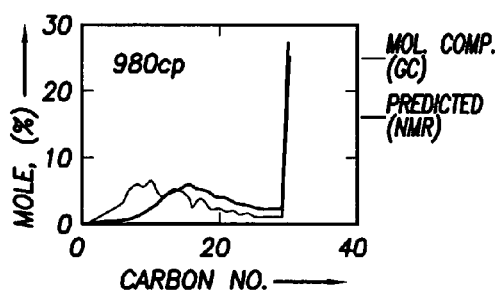
Figure 14O:
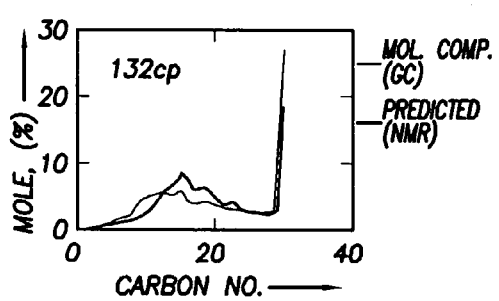
Figure 14L:
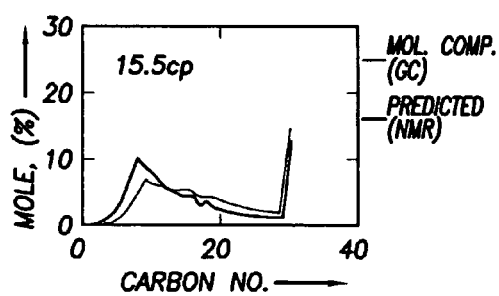
Figure 14P:
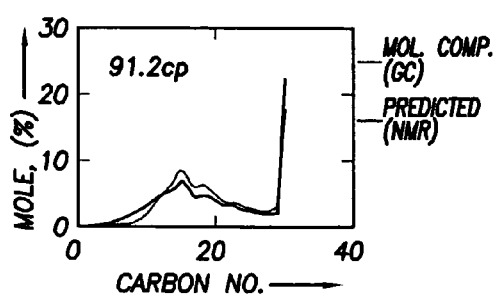

The technique hereof can also be applied directly to NMR time-domain data instead of using computed quantities like T2 and D distributions. That is, for example, the Carr-Purcell-Meiboom-Gill (CPMG) spin echoes from which the T2 distributions in FIG. 12b were computed can be used as the inputs in the database. Then, the compositions can be predicted, for example, directly from the CPMG time-domain data. This follows logically, since the T2 distributions in FIG. 9 were computed from the CPMG data. Therefore, information on the oil composition must also be contained in the CPMG data. The T2 distributions shown in FIG. 9 were computed from the 16,000 spin echoes acquired for each oil sample in Table 1. The T2 distributions were computed using the "window processing" method described in U.S. Pat. No. 5,291,137, which teaches that the NMR spin-echo data can be compressed, without loss of information, into a relatively small number of window sums. In this case the 16,000 echoes were compressed into 16 window sums. The 16 window sums were used to compute the T2 distributions for each oil sample using the processing method of the '317 patent. The 16 window sums or the 16,000 echoes must contain at least as much information on the oil compositions as do the T2 distributions. The window sums divided by the number of echoes in each window are shown in FIGS. 13A–P, respectively. These are called normalized window sums. The oil compositions predicted from the normalized window sums for each sample using the technique hereof are shown in FIGS. 14A–P, respectively. It can be noted that the predicted compositions in FIGS. 14A–P are essentially identical to the compositions in FIG. 12b that were predicted from the T2 distributions. It will be evident that the compositions could also be predicted from the uncompressed spin echoes. It will also be evident that although CPMG data were used in this example to illustrate the prediction of composition, other NMR sequences, such as suites of diffusion-weighted spin echoes, can also be used to predict compositions.

The foregoing has focused primarily on using NMR measurements to predict fluid properties. The radial basis function method can be applied to other (i.e., non-NMR) measurements for which there exists a recognizable pattern in the mapping that relates the measurements to fluid properties. For example, measurements of the optical density of live oils versus wavelength are made in the near infrared region. The optical density ($\vec{D}_o$) is an n-dimensional vector where n is the number of wavelengths measured by the optical spectrometer. The optical density for a beam of monochromatic (single wavelength) radiation is (Skoog and West, *Fundamentals of Analytical Chemistry*, pp. 505–511), $$D_o \equiv \log\frac{P_o}{P} = \alpha \cdot c \cdot b. \quad (11)$$

where $P_o$ and P are the incident and transmitted power of a beam of radiation that has traversed b centimeters of an absorbing medium that contains c moles per liter of an absorbing substance with molar absorptivity equal to $\alpha$. The equality on the right is known as Beer's law.

In accordance with a further embodiment hereof, the prediction of fluid properties of live crude oils from non-NMR measurements using radial basis function interpolation can be viewed as constructing the non-linear mapping from a vector input (e.g., $\vec{D}_o$) to a vector or scalar output (e.g., composition or gas-oil ratio) given a suite of input-output examples (data). Consider a database of input-output pairs whose inputs for each oil sample consists, for example, of optical density measurements ($\vec{D}_{o,i}$, i=1, 2, . . . , n), temperatures ($T_i$), pressures ($P_i$), and corresponding output molecular compositions ($\vec{M}_i$). The molecular composition for a crude oil sample not in the database can be predicted using the equation, $$\vec{M} = \frac{\sum_{j=1}^{N}\vec{w}_j \exp\left(-\frac{\|\vec{D}_o - \vec{D}_{o,j}\|^2}{2\sigma_j^2}\right) \cdot \exp\left(-\frac{(T-T_j)^2}{2\sigma_T^2}\right) \cdot \exp\left(-\frac{(P-P_j)^2}{2\sigma_P^2}\right)}{\sum_{j=1}^{N}\exp\left(-\frac{\|\vec{D}_o - \vec{D}_{o,j}\|^2}{2\sigma_j^2}\right) \cdot \exp\left(-\frac{(T-T_j)^2}{2\sigma_T^2}\right) \cdot \exp\left(-\frac{(P-P_j)^2}{2\sigma_P^2}\right)}. \quad (12)$$

Optimal weight vectors and radial basis function widths are determined by minimizing a cost function that is the sum of the squared differences between the molecular compositions predicted by Eq. 12 and those in the training set database.

Although the prior example use is infrared optical density measurements it will be understood that other measurements including optical, x-ray, acoustic, microwave, near infrared, infrared, sonic, resistivity, etc. can also be used provided that a (1) a database of input-output pairs exist for a wide range of oils and (2) that there exist a correlation between the inputs and outputs. The method can also be applied to prediction of reservoir petrophysical properties such as permeability, fluid saturations, porosity, bound-fluid, etc. from a database that consists, for example, of well-logging, core analysis, and fluid sampling measurements.

As noted above, multiple measurements can be used to construct the mapping function. Optical density and NMR measurements, for example, can therefore be combined to predict molecular composition. The combination of two or more measurements adds additional information that can improve the accuracy of predicted reservoir properties.

The invention claimed is:

1. A method for determining a property of fluids in formations surrounding an earth borehole, comprising the steps of:
   producing, from measurements on a multiplicity of fluid samples, a database of stored fluid property training values related to stored fluid measurement training values;
   deriving, from said database, radial basis function parameters;
   deriving formation fluid measurement values; and
   determining, using radial basis function interpolation, said property of formation fluids from values in said database, said parameters, and said derived formation fluid measurement values.

2. The method as defined by claim 1, wherein said step of deriving, from said database, radial basis function parameters, comprises producing a radial basis function mapping function; producing a cost function using values in the database and the mapping function; and minimizing said cost function to determine said parameters.

3. The method as defined by claim 1, wherein said parameters are weights and widths.

4. The method as defined by claim 3, wherein said weight parameters are determined from output vectors derived from said database.

5. The method as defined by claim 1, wherein said step of deriving formation fluid measurement values comprises deriving nuclear magnetic resonance measurement values from fluid sampled from said formations.

6. The method as defined by claim 5, wherein said step of deriving formation fluid measurement values further comprises deriving measurement values for temperature of said formation fluid.

7. The method as defined by claim 5, wherein said step of deriving formation fluid measurement values further comprises deriving measurement values for pressure of said formation fluid.

8. The method as defined by claim 5, wherein said step of deriving formation fluid measurement values further comprises deriving measurement values for gas-oil ratio of said formation fluid.

9. The method as defined by claim 1, wherein said property of formation fluids comprises viscosity of formation fluids.

10. The method as defined by claim 5, wherein said property of formation fluids comprises viscosity of formation fluids.

11. The method as defined by claim 8, wherein said property of formation fluids comprises viscosity of formation fluids.

12. The method as defined by claim 1, wherein said property of formation fluids comprises gas-oil ratio of formation fluids.

13. The method as defined by claim 1, wherein said property of formation fluids comprises molecular composition of formation fluids.

14. The method as defined by claim 1, wherein said property of formation fluids comprises fluid density of formation fluids.

15. The method as defined by claim 1, wherein said property of formation fluids comprises bubble point pressure of formation fluids.

16. The method as defined by claim 1, wherein said property of formation fluids comprises oil formation volume factor of formation fluids.

17. The method as defined by claim 1, wherein said property of formation fluids comprises SARA.

18. The method as defined by claim 1, wherein said step of deriving formation fluid measurement values comprises deriving optical measurements from fluid sampled from said formations.

19. The method as defined by claim 1, wherein said step of deriving formation fluid measurement values comprises deriving gas-oil ratio measurements from fluid sampled from said formations.

20. The method as defined by claim 1, wherein said step of deriving formation fluid measurement values comprises deriving nuclear magnetic resonance measurement values using a nuclear magnetic resonance logging device in said borehole.

21. The method as defined by claim 5, wherein said step of deriving nuclear magnetic resonance measurement values using a nuclear magnetic resonance logging device in said borehole comprises drawing fluid from the borehole, and deriving said nuclear magnetic resonance measurement values from measurements on the fluid withdrawn from the borehole.

22. The method as defined by claim 1, wherein said step of producing, from measurements on a multiplicity of fluid samples, a database of stored fluid property training values related to stored fluid measurement training values comprises producing a database of stored fluid viscosity training values related to stored fluid nuclear magnetic resonance training values, and wherein said step of deriving formation fluid measurement values comprises deriving nuclear magnetic resonance measurement values from fluid sampled from said formations, and wherein said step of determining said property of formation fluids comprises determining viscosity of formation fluids.

23. The method as defined by claim 2, wherein said step of producing, from measurements on a multiplicity of fluid samples, a database of stored fluid property training values related to stored fluid measurement training values comprises producing a database of stored fluid viscosity training values related to stored fluid nuclear magnetic resonance training values, and wherein said step of deriving formation fluid measurement values comprises deriving nuclear magnetic resonance measurement values from fluid sampled from said formations, and wherein said step of determining said property of formation fluids comprises determining viscosity of formation fluids.

24. The method as defined by claim 4, wherein said step of producing, from measurements on a multiplicity of fluid samples, a database of stored fluid property training values related to stored fluid measurement training values comprises producing a database of stored fluid viscosity training values related to stored fluid nuclear magnetic resonance training values, and wherein said step of deriving formation fluid measurement values comprises deriving nuclear magnetic resonance measurement values from fluid sampled from said formations, and wherein said step of determining said property of formation fluids comprises determining viscosity of formation fluids.

25. The method as defined by claim 1, wherein said property of formation fluids is represented by a vector having a plurality of dimensions.

26. The method as defined by claim 1, wherein said fluid measurement values are represented by a vector having a plurality of dimensions.

27. The method as defined by claim 23, wherein said fluid measurement values are represented by a vector having a plurality of dimensions.

28. The method as defined by claim 1, further comprising repeating the steps of said method for formation fluid measurement values derived at different depth levels of said borehole, and producing a log of said property as determined at said different depth levels.

29. The method as defined by claim 1, wherein said property of formation fluids is molecular composition.

30. A method for determining a property of fluids from formations surrounding an earth borehole which have been drawn into a logging device in the borehole, comprising the steps of:
    producing, beforehand, from measurements on a multiplicity of fluid samples, a database of stored fluid property training values related to stored fluid measurement training values;
    deriving, from said database, radial basis function parameters;
    deriving, from measurements on said fluids that have been drawn into said logging device, formation fluid measurement values; and
    determining, using radial basis function interpolation, said property of formation fluids from values in said database, said parameters, and said derived formation fluid measurement values.

31. The method as defined by claim 30, wherein said step of deriving formation fluid measurement values comprises deriving nuclear magnetic resonance measurement values from fluid sampled from said formations.

32. The method as defined by claim 30, wherein said property of formation fluids comprises viscosity of formation fluids.

33. The method as defined by claim 30, wherein said property of formation fluids comprises molecular composition of formation fluids.

34. The method as defined by claim 30, wherein said parameters are weights and widths.

35. The method as defined by claim 30, wherein said property of formation fluids comprises SARA of formation fluids.

36. A method for determining a property of fluids in formations surrounding an earth borehole from a database of stored fluid property training values, comprising the steps of:
    deriving, from said database, radial basis function parameters;
    deriving formation fluid measurement values; and
    determining, using radial basis function interpolation, said property of formation fluids from values in said database, said parameters, and said derived formation fluid measurement values.

* * * * *